(12) United States Patent
Wilson et al.

(10) Patent No.: US 7,038,661 B2
(45) Date of Patent: May 2, 2006

(54) POINTING DEVICE AND CURSOR FOR USE IN INTELLIGENT COMPUTING ENVIRONMENTS

(75) Inventors: Andrew Wilson, Seattle, WA (US); Hubert Pham, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 10/461,646

(22) Filed: Jun. 13, 2003

(65) Prior Publication Data

US 2004/0252102 A1 Dec. 16, 2004

(51) Int. Cl.
*G09G 5/08* (2006.01)
(52) U.S. Cl. ...................... 345/158; 345/157
(58) Field of Classification Search ............. 345/157, 345/158

See application file for complete search history.

(56) References Cited

U.S. PATENT DOCUMENTS

| | | | | |
|---|---|---|---|---|
| 5,825,350 A * | 10/1998 | Case et al. | ............ | 345/163 |
| 5,926,168 A * | 7/1999 | Fan | ............ | 345/158 |
| 6,034,672 A * | 3/2000 | Gaultier et al. | ............ | 345/173 |
| 6,081,255 A * | 6/2000 | Narabu | ............ | 345/158 |
| 6,297,804 B1 * | 10/2001 | Kashitani | ............ | 345/157 |
| 6,952,198 B1 * | 10/2005 | Hansen | ............ | 345/158 |
| 2001/0044858 A1 * | 11/2001 | Rekimoto | ............ | 710/1 |
| 2003/0193572 A1 * | 10/2003 | Wilson et al. | ............ | 348/207.99 |

OTHER PUBLICATIONS

Myers, B. A., R. Bhatnagar, J. Nichols, C. H. Peck, D. Kong, R. Miller, and A. C. Long, Interacting at a distance: Measuring the performance of laser pointers and other devices, *Proceedings CHI*, 2002, Minneapolis, Minnesota.

* cited by examiner

*Primary Examiner*—Kent Chang
*Assistant Examiner*—Joseph Maresca
(74) *Attorney, Agent, or Firm*—Lyon & Harr, LLP; Richard T. Lyon

(57) ABSTRACT

A system and process for directing a laser beam within a space is presented. The system includes a pointing device which periodically outputs orientation data indicative of the direction it is pointing and a cursor device which projects a laser beam. The orientation data is used to compute the direction the pointing device is pointing in terms of yaw and pitch angles. The laser beam is directed to locations in the space relative to the amount of movement of the pointing device. In an absolute mode, the pointed device and the laser beam of the cursor device are pointed at the same location in the space, whereas in a relative mode, the pointing device does not point at the same location as the laser beam. The position of the laser can be used to select a variety of hardware devices known to be in a room for future control actions.

30 Claims, 10 Drawing Sheets

POINTING DEVICE AND CURSOR FOR USE IN INTELLIGENT COMPUTING ENVIRONMENTS

BACKGROUND

1. Technical Field

The invention is related to cursor devices, and more particularly to a system and process for directing a laser beam within a space to act as a cursor in an intelligent computing environment.

2. Background Art

Ubiquitous (i.e., intelligent) computing promises to blur the boundaries between traditional desktop computing and the everyday physical world. A popular vision of tomorrow's computing pushes computational abilities into everyday objects, each participating in a complex and powerful integrated intelligent environment. Tomorrow's home and office environments, for example, may include a variety of small and large networked displays and smart controllable devices. For instance, the modern living room typically features a television, amplifier, DVD player, lights, computers, and so on. In the near future, these devices will become more inter-connected, more numerous and more specialized as part of an increasingly complex and powerful integrated intelligent environment.

This migration away from the desktop and "into the walls" presents several challenges for user interface design. For example, how does the user of tomorrow's intelligent environment select one of many devices? Today, this problem is most often addressed by maintaining a separate interface, such as an IR remote control, for each device.

Tomorrow's intelligent environment presents the opportunity to present a single intelligent user interface (UI) to control many such devices when they are networked. This UI device should provide the user a natural interaction with intelligent environments. For example, people have become quite accustomed to pointing at a piece of electronic equipment that they want to control, owing to the extensive use of IR remote controls. It has become almost second nature for a person in a modern environment to point at the object he or she wants to control, even when it is not necessary. Take the small radio frequency (RF) key fobs that are used to lock and unlock most automobiles in the past few years as an example. Inevitably, a driver will point the free end of the key fob toward the car while pressing the lock or unlock button. This is done even though the driver could just have well pointed the fob away from the car, or even pressed the button while still in his or her pocket, owing to the RF nature of the device. Thus, a single UI device, which is pointed at electronic components or some extension thereof (e.g., a wall switch to control lighting in a room) to control these components, would represent an example of the aforementioned natural interaction that is desirable for such a device.

There are some so-called "universal" remote controls on the market that are preprogrammed with the known control protocols of a litany of electronic components, or which are designed to learn the command protocol of an electronic component. Typically, such devices are limited to one transmission scheme, such as IR or RF, and so can control only electronic components operating on that scheme. However, it would be desirable if the electronic components themselves were passive in that they do not have to receive and process commands from the UI device directly, but would instead rely solely on control inputs from the aforementioned network. In this way, the UI device does not have to differentiate among various electronic components, say by recognizing the component in some manner and transmitting commands using some encoding scheme applicable only to that component, as is the case with existing universal remote controls.

Of course, a common control protocol could be implemented such that all the controllable electronic components within an environment use the same control protocol and transmission scheme. However, this would require all the electronic components to be customized to the protocol and transmission scheme, or to be modified to recognize the protocol and scheme. This could add considerably to the cost of a "single UI-controlled" environment. It would be much more desirable if the UI device could be used to control any networked group of new or existing electronic components regardless of remote control protocols or transmission schemes the components were intended to operate under.

It is noted that in the remainder of this specification, the description refers to various individual publications identified by a numeric designator contained within a pair of brackets. For example, such a reference may be identified by reciting, "reference [1]" or simply "[1]". A listing of references including the publications corresponding to each designator can be found at the end of the Detailed Description section.

SUMMARY

The present invention involves a system and process for directing a laser beam within a space to act as a cursor. This cursor device, which will be referred to as the WorldCursor, is analogous to the mouse and cursor used in traditional graphic user interfaces. Namely, a user may select and interact with a physical device by positioning the cursor on the device and clicking. However, the WorldCursor goes much further. It is a solution to providing a natural, expressive interface for interaction in ubiquitous computing environments, where it is often a requirement to interact with devices beyond the desktop, and often in scenarios in which the traditional mouse and keyboard are inappropriate or unavailable. For example, the WorldCursor allows the user to point at and select items within a room, much as a mouse allows a user to point at objects on a computer display.

The WorldCursor device itself includes a small platform that is typically installed on the ceiling. It has two small servo motors of the kind used in radio-controlled airplanes, and a laser, such as the red lasers used in laser pointing devices currently employed to give presentations. The first of the servos is configured so as to move the laser in a manner that controls the yaw direction of the laser beam and the other servo is configured so as to move the laser in a manner that controls the pitch direction of the laser beam. Thus, under computer control, the motors may be steered to point the laser almost anywhere in the room.

One embodiment of the system employs control inputs from a conventional device such as a computer mouse, trackball, gamepad, or the like to dictate the movement of the WorldCursor laser. In this embodiment the computer controlling the movement of the laser receives movement control commands generated by one of the aforementioned movement control devices which specifies the direction the laser beam is to be pointed. The computer then provides commands to the WorldCursor device that direct the laser beam to move about the space as specified by the movement control commands.

In another embodiment of the WorldCursor system, a pointing device is included that periodically outputs orientation data indicative of the direction it is pointing. In addition, the WorldCursor and pointing devices are both in communication with the aforementioned computer which runs a program that receives the orientation data output by the pointing device and computes the direction the pointing device is pointing from the received orientation data in terms of yaw and pitch angles. The program then directs the laser beam generated by the WorldCursor to a particular location in the space as determined by the direction the pointing device is pointing.

The present system can further be employed to implement a process for selecting an object within a space. In general, this involves a user causing the laser beam to shine on a selectable object by manipulating the pointing device and then using the device to select the object.

In tested versions of the WorldCursor system, the pointing device took the form of a hardware device referred to as the XWand, which is the subject of a co-pending U.S. patent application entitled "A SYSTEM AND PROCESS FOR SELECTING OBJECTS IN A UBIQUITOUS COMPUTING ENVIRONMENT" which was filed on May 31, 2002 and issued Ser. No. 10/160,692. The XWand is a hardware device and software system which allows the user to point at and operate various objects in the room. For example, the user may point the XWand at a known light, push a button on the XWand, and the light may turn on.

More particularly, the XWand device contains onboard sensors to support the computation of orientation information and gesture recognition. These sensors include a pair of accelerometers. When motionless, these accelerometers sense the acceleration due to gravity, and each can be used to sense either the pitch or roll angle of the device. Another of the sensors is a 3-axis magnetoresistive permalloy magnetometer. This senses the direction of the Earth's magnetic field in 3 dimensions, and can be used to compute the yaw angle of the device. The values from the accelerometer and magnetometer are relayed to a host computer by radio link. These values are combined to find the absolute orientation of the device with respect to the room. This orientation is updated in real time at a rate of about 50 Hz, and is accurate to a few degrees in each of yaw, pitch and roll axes.

The XWand system determines which device the user is pointing at by combining the orientation and 3-D position of the XWand with a 3-D model of the room and the devices within it. Orientation of the XWand is determined as explained above from the onboard sensors, while XWand position is determined with stereo computer vision. The 3-D model of the room and devices is entered into the system by pointing with the XWand itself in a special training mode. With the orientation, position and model of the room, it is easy to determine which if any object in the world model the XWand is pointing at. Audio feedback is provided to indicate to the user that the object is known to the system and can be controlled by the XWand, but in general little feedback is necessary since the pointing is absolute in nature.

The WorldCursor improves upon the XWand system by not requiring an external position sensing technology. There are a number of drawbacks to using the external computer vision system. First, the system involves installing multiple cameras in the room. Part of the installation requires a rather precise calibration of the cameras against the geometry of the room. Secondly, the acquisition of the geometric model of the room and its devices requires a further calibration phase. Thirdly, computer vision techniques rely on having a clear line of sight to the device. Although this can be alleviated somewhat by installing more cameras, this approach can be prohibitively expensive and complex to install. Finally, installation of cameras inevitably raises privacy objections. The combination of the WorldCursor with the XWand eliminates the need for the external camera setup.

In a first mode of operation of the WorldCursor, the laser beam is directed in an absolute pointing mode where the location that the laser beam is pointed is substantially the same location that the pointing device (e.g., the XWand) is pointing. The process that accomplishes this absolute pointing mode involves first computing a set of offset angles for the laser made up of respective yaw and pitch angles that define the angular distance between the origin of a spherical coordinate system associated with the WorldCursor and a prescribed origin of the spherical coordinate system for the space. Likewise, a set of offset angles for the pointing device are computed that represent the respective yaw and pitch angles defining the angular distance between the origin of a spherical coordinate system associated with the pointing device and the prescribed origin of the spherical coordinate system for the space. Next, aligning pitch and yaw angles are computed that define how far the laser must be moved in order to point the laser beam at the approximately the same point in the space that the pointing device is pointing. The aligning pitch angle is defined as the sum of the offset pitch angle of the laser and the computed pitch angle of the pointing device less its offset pitch angle, and the aligning yaw angle is defined as the sum of the offset yaw angle of the laser and the computed yaw angle of the pointing device less its offset yaw angle. Once the aligning angles are computed, the laser is moved to these angles so as to point the laser beam at approximately the same location in the space that the pointing device is pointing.

It is noted that the offset angles computed above are initial angle values which are typically only valid for a part of the space. If the pointing device and WorldCursor are very close to each other, the angle values would remain valid no matter where the pointing device is directed. However, this will not be the usual case because the WorldCursor will typically be mounted on the ceiling of the space. If the pointing device is pointed outside the part of the space where the initial offset values are valid, the correspondence between the location the pointing device is pointing and the location the laser beam is shining is lost. Thus, the correspondence must be maintained in order to continue operating in the absolute pointing mode. If the user desires that the laser spot appear where the pointing device is pointed, or if the user would like to have the spot at least be in the field of the view of the user as they use the pointing device, a "clutching" procedure can be employed. To clutch the WorldCursor, the user momentarily activates a switch on the pointing device (e.g., pushes its button) whose state is included in each orientation data message sent by the pointing device. When the switch is activated, the laser stops moving with the pointing device and the user then reorients the pointing device, lining it up so that it points directly at the laser spot. When ready to resume WorldCursor control, the user reactivates the switch and the laser spot beings moving again in correspondence with the pointing device.

It is noted that the user could also orient the pointing device during a clutching operation such that it does not point at the laser spot. If so, this creates a relative pointing condition where the laser mimics the movements of the pointing device (e.g., moving the XWand left or right produces the same direction of movement in the laser beam), but not in correspondence with it. It is not clear if users require even approximate correspondence for successful use of the device. Experience with computer mice suggests that this is not necessary. Thus, this relative pointing mode may be of no consequence to the user, or even preferred.

One desirable feature of this system is that it does not require the 3D position of the pointing device to be known, nor a 3D model of the room or of the devices within the room. Active devices such as lights, displays, etc., need only be known to the system by their spherical (yaw, pitch) coordinates which are used to set the position of the two motors on the WorldCursor device. This can be accomplished using outside methods or by using the WorldCursor to generate a model of the space. In general, a model of the space can be accomplished by pointing the laser beam at an object in the space and recording the pitch and yaw angles of the laser as its location. The user can then enter its extent in the form of a radius defining a circle that is used represent the object. Alternately, objects, such as walls, can be represented by polygons. In this case, the laser beam is made to shine on each vertex of the polygon representing an object and the spherical coordinates of the laser are recorded for each point. In either the circle or polygon cases, the user can also enter information about the object, such as its identity that can be used to control the object once it is selected.

Once the space has been modeled as described above, it is possible to determine whether the laser beam is shining on a modeled object so that it can be selected for future control actions. In the case of a circle representing an object in the space, the laser beam is considered to be on the object if the WorldCursor's laser pitch and yaw angles are within the specified radius of the circle. In the case of a polygon representing an object, a conventional point-in-polygon technique can be use to determine if the laser beam is on the object. Still further, it is possible to determine the point on a polygon representing an object in the space that the laser beam is shining on using a transform that maps the pitch and yaw angle coordinates of the laser to orthogonal coordinates of the polygon.

It is even possible to use the WorldCursor and the pointing device to generate a 3D model of the space where objects are modeled as 3D points with extents or as polygons. More particularly, given the 3D location of the pointing device and its orientation in combination with the 3D location of the WorldCursor and the orientation of its laser (which is assumed to be directed at the same point as the pointing device), then, it is possible to solve for unknown 3D point coordinates for any location the laser is shining on.

A procedure that can be employed to establish and maintain a reasonable correspondence between the pointing device and WorldCursor without clutching involves exploiting the geometry of the space in which the WorldCursor system is operating. If the geometry of the room is known in terms of a 3D coordinate system, whether obtained from an outside source or generated as described above, as well as the 3D positions of the WorldCursor, and the pointing device, then the WorldCursor may be controlled such that the pointing device always points directly at the laser spot. It is noted that a reasonable correspondence between the laser beam and the pointing device can be maintained even if the 3D location of the pointing device is not known absolutely but is assumed to be at a location that it generally can be found.

However, if the approximate 3D geometry of the space is known or generated as described above, then there is also a technique to compute the precise 3D position of the pointing device (assuming it is unknown to the system) by exploiting the above mentioned clutching operation. In this way a more precise correspondence can be maintained as explained above. If the user is clutching so that the pointing device points at the laser spot, each of these clutching operations provide information that can be related mathematically to the 3D position of the pointing device. After a few such clutching operations, it is possible to compute the 3D position of the device. The advantage in doing so is that no more clutching operations are necessary to maintain pointing device-WorldCursor correspondence, so long as the actual position of the pointing device does not change dramatically. It is noted that this online calibration requires no more clutching operations than the system which does not exploit the approximate room geometry. Further in the long run it requires fewer clutching operations if the user does not move about the room often.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
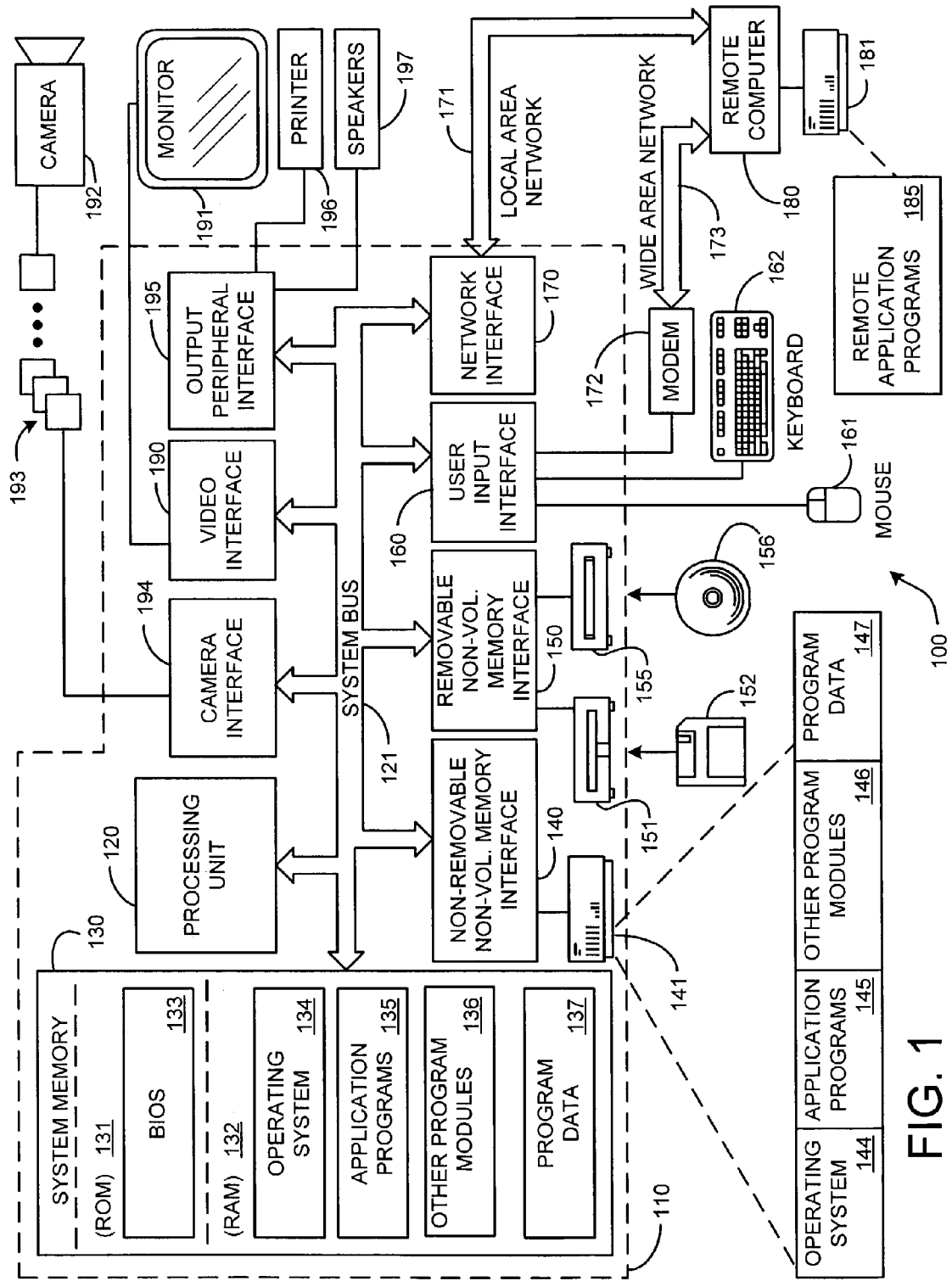
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180.

The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention.

2.0 The XWand System

In a co-pending U.S. patent application entitled "A SYSTEM AND PROCESS FOR SELECTING OBJECTS IN A UBIQUITOUS COMPUTING ENVIRONMENT" which was filed on May 31, 2002 and issued Ser. No. 10/160,692, a system and process was introduced that provides a remote control UI device that is capable of controlling a group of networked electronic components. More particularly, the UI device, which will herein be referred to as the XWand, is able to control the electronic components without having to directly differentiate among the components or employ a myriad of different control protocols and transmission schemes. And in order to provide a natural interaction experience, the present system is operated by having the user point at the electronic component (or an extension thereof) that he or she wishes to control. In particular, the XWand provides a remote control UI device that can be simply pointed at objects in an ubiquitous computing environment that are associated in some way with controllable, networked electronic components, so as to select that object for controlling via the network. This can for example involve pointing the UI device at a wall switch and pressing a button on the device to turn a light operated by the switch on or off. The idea is to have a UI device so simple that it requires no particular instruction or special knowledge on the part of the user.

The XWand system includes the aforementioned remote control UI device in the form of a wireless RF pointer, which includes a radio frequency (RF) transceiver and various orientation sensors. The outputs of the sensors are periodically packaged as orientation messages and transmitted using the RF transceiver to a base station, which also has a RF transceiver to receive the orientation messages transmitted by the pointer. There is also a pair of digital video cameras each of which is located so as to capture images of the environment in which the pointer is operating from different viewpoints. A computer, such as a PC, is connected to the base station and the video cameras. Orientation messages received by the base station from the pointer are forwarded to the computer, as are images captured by the video cameras. The computer is employed to compute the orientation and location of the pointer using the orientation messages and captured images. The orientation and location of the pointer is in turn used to determine if the pointer is being pointed at an object in the environment that is controllable by the computer via a network connection. If it is, the object is selected.

The pointer specifically includes a case having a shape with a defined pointing end, a microcontroller, the aforementioned RF transceiver and orientation sensors which are connected to the microcontroller, and a power supply (e.g., batteries) for powering these electronic components. In the tested versions of the pointer, the orientation sensors included at least, an accelerometer that provides separate x-axis and y-axis orientation signals, and a magnetometer that provides separate x-axis, y-axis and z-axis orientation signals. These electronics were housed in a case that resembled a wand—hence the XWand name.

The pointer's microcontroller packages and transmits orientation messages at a prescribed rate. While the microcontroller could be programmed to accomplish this task by itself, a command-response protocol was employed in tested versions of the system. This entailed the computer periodically instructing the pointer's microcontroller to package and transmit an orientation message by causing the base station to transmit a request for the message to the pointer at the prescribed rate. This prescribed rate could for example be approximately 50 times per second as it was in tested versions of the system.

As indicated previously, the orientation messages generated by the pointer include the outputs of the sensors. To this end, the pointer's microcontroller periodically reads and stores the outputs of the orientation sensors. Whenever a request for an orientation message is received (or it is time to generate such a message if the pointer is programmed to do so without a request), the microcontroller includes the last-read outputs from the accelerometer and magnetometer in the orientation message.

The pointer also includes other electronic components such as a user activated switch or button, and a series of light emitting diodes (LEDs). The user-activated switch, which is also connected to the microcontroller, is employed for the purpose of instructing the computer to implement a particular function. To this end, the state of the switch in regard to whether it is activated or deactivated at the time an orientation message is packaged is included in that message for transmission to the computer. The series of LEDs includes a pair of differently-colored, visible spectrum LEDs, which are connected to the microcontroller, and which are visible from the outside of the pointer's case when lit. These LEDs are used to provide status or feedback information to the user, and are controlled via instructions transmitted to the pointer by the computer.

The foregoing system is used to select an object by having the user simply point to the object with the pointer. This entails the computer first inputting the orientation messages transmitted by the pointer. For each message received, the computer derives the orientation of the pointer in relation to a predefined coordinate system of the environment in which the pointer is operating using the orientation sensor readings contained in the message. In addition, the video output from the video cameras is used to ascertain the location of the pointer at a time substantially contemporaneous with the generation of the orientation message and in terms of the predefined coordinate system. Once the orientation and location of the pointer are computed, they are used to determine whether the pointer is being pointed at an object in the environment that is controllable by the computer. If so, then that object is selected for future control actions.

The computer derives the orientation of the pointer from the orientation sensor readings contained in the orientation message as follows. First, the accelerometer and magnetometer output values contained in the orientation message are normalized. Angles defining the pitch of the pointer about the x-axis and the roll of the device about the y-axis are computed from the normalized outputs of the accelerometer. The normalized magnetometer output values are then refined using these pitch and roll angles. Next, previously established correction factors for each axis of the magnetometer, which relate the magnetometer outputs to the predefined coordinate system of the environment, are applied to the associated refined and normalized outputs of the magnetometer. The yaw angle of the pointer about the z axis is computed using the refined magnetometer output values. The computed pitch, roll and yaw angles are then tentatively designated as defining the orientation of the pointer at the time the orientation message was generated. It is next determined whether the pointer was in a right-side up or up-side down position at the time the orientation message was generated. If the pointer was in the right-side up position, the previously computed pitch, roll and yaw angles are designated as the defining the finalized orientation of the pointer. However, if it is determined that the pointer was in the up-side down position at the time the orientation message was generated, the tentatively designated roll angle is corrected accordingly, and then the pitch, yaw and modified roll angle are designated as defining the finalized orientation of the pointer. In the foregoing description, it is assumed that the accelerometer and magnetometer of the pointer are oriented such that their respective first axis corresponds to the x-axis which is directed laterally to a pointing axis of the pointer and their respective second axis corresponds to the y-axis which is directed along the pointing axis of the pointer, and the third axis of the magnetometer correspond to the z-axis which is directed vertically upward when the pointer is positioned right-side up with the x and y axes lying in a horizontal plane.

The computer derives the location of the pointer from the video output of the video cameras as follows. There is an infrared (IR) LED connected to the microcontroller that is able to emit IR light outside the pointer's case when lit. The microcontroller causes the IR LEDs to flash. In addition, the aforementioned pair of digital video cameras each have an IR pass filter that results in the video image frames capturing only IR light emitted or reflected in the environment toward the camera, including the flashing from the pointer's IR LED which appears as a bright spot in the video image frames. The microcontroller causes the IR LED to flash at a prescribed rate that is approximately one-half the frame rate of the video cameras. This results in only one of each pair of image frames produced by a camera having the IR LED flashes depicted in it. This allows each pair of frames produced by a camera to be subtracted to produce a difference image, which depicts for the most part only the IR emissions and reflections directed toward the camera which appear in one or the other of the pair of frames but not both (such as the flash from the IR LED of the pointing device). In this way, the background IR in the environment is attenuated and the IR flash becomes the predominant feature in the difference image. The image coordinates of the pixel in the difference image that exhibits the highest intensity is then identified using a standard peak detection procedure. A conventional stereo image technique is then employed to compute the 3D coordinates of the flash for each set of approximately contemporaneous pairs of image frames generated by the pair of cameras using the image coordinates of the flash from the associated difference images and predetermined intrinsic and extrinsic camera parameters. These coordinates represent the location of the pointer (as represented by the location of the IR LED) at the time the video image frames used to compute them were generated by the cameras.

The orientation and location of the pointing device at any given time is used to determine whether the pointing device is being pointed at an object in the environment that is controllable by the computer. In order to do so the computer must know what objects are controllable and where they exist in the environment. This requires a model of the environment. In the XWand system, the location and extent of objects within the environment that are controllable by the computer are modeled using 3D Gaussian blobs defined by a location of the mean of the blob in terms of its environmental coordinates and a covariance. Two different methods have been developed to model objects in the environment.

The first involves the user inputting information identifying the object that is to be modeled. The user then activates the switch on the pointing device and traces the outline of the object. Meanwhile, the computer is running a target training procedure that causes requests for orientation messages to be sent to the pointing device a prescribed request rate. The orientation messages are input as they are received, and for each orientation message, it is determined whether the switch state indicator included in the orientation message indicates that the switch is activated. Whenever it is initially determined that the switch is not activated, the switch state determination action is repeated for each subsequent orientation message received until an orientation message is received which indicates that the switch is activated. At that point, each time it is determined that the switch is activated, the location of the pointing device is ascertained as described previously using the digital video input from the pair of video cameras. When the user is done tracing the outline of the object being modeled, he or she deactivates the switch. The target training process sees this as the switch has been deactivated after having been activated in the immediately preceding orientation message. Whenever such a condition occurs, the tracing procedure is deemed to be complete and a 3D Gaussian blob representing the object is established using the previously ascertained pointing device locations stored during the tracing procedure.

The second method of modeling objects once again begins by the user inputting information identifying the object that is to be modeled. However, in this case the user repeatedly points the pointer at the object and momentarily activates the switch on the device, each time pointing the device from a different location within the environment. Meanwhile, the computer is running a target training procedure that causes requests for orientation messages to be sent to the pointing device at a prescribed request rate. Each orientation message received from the pointing device is input until the user indicates the target training inputs are complete. For each orientation message input, it is determined whether the switch state indicator contained therein indicates that the switch is activated. Whenever it is determined that the switch is activated, the orientation of the pointing device is computed as described previously using orientation sensor readings also included in the orientation message. In addition, the location of the pointing device is ascertained using the inputted digital video from the pair of video cameras. The computed orientation and location values are stored. Once the user indicates the target training inputs are complete, the location of the mean of a 3D Gaussian blob that will be used to represent the object being modeled is computed from the pointing device's stored orientation and location values. The covariance of the Gaussian blob is then obtained in one of various ways. For example, it can be a prescribed covariance, a user input covariance, or the covariance can be computed by adding a minimum covariance to the spread of the intersection points of rays defined by the pointing device's stored orientation and location values.

With a Gaussian blob model of the environment in place, the orientation and location of the pointing device can be is used to determine whether the pointing device is being pointed at an object in the environment that is controllable by the computer. In one version of this procedure, for each Gaussian blob in the model, the blob is projected onto a plane which is normal to either a line extending from the location of the pointing device to the mean of the blob or a ray originating at the location of the pointing device and extending in a direction defined by the orientation of the device. The value of the resulting projected Gaussian blob at a point where the ray intersects the plane is computed. This value represents the probability that the pointing device is pointing at the object associated with the blob under consideration. Next, the probability representing the largest value computed for the Gaussian blobs, if any, is identified. At this point, the object associated with the Gaussian blob from which the largest probability value was derived could be designated as being the object that the pointing device is pointing at. However, an alternate thresholding procedure could be employed instead. In this alternate version, it is first determined whether the probability value identified as the largest exceeds a prescribed minimum probability threshold. Only if the threshold is exceeded is the object associated with the projected Gaussian blob from which the largest probability value was derived designated as being the object that the pointer is pointing at. The minimum probability threshold is chosen to ensure the user is actually pointing at the object and not just near the object without an intent to select it.

In an alternate procedure for determining whether the pointing device is being pointed at an object in the environment that is controllable by the computer, for each Gaussian blob, it is determined whether a ray originating at the location of the pointing device and extending in a direction defined by the orientation of the device intersects the blob. Next, for each Gaussian blob intersected by the ray, it is determined what the value of the Gaussian blob is at a point along the ray nearest the location of the mean of the blob. This value represents the probability that the pointing device is pointing at the object associated with the Gaussian blob. The rest of the procedure is similar to the first method in that the object associated with the Gaussian blob from which the largest probability value was derived could be designated as being the object that the pointing device is pointing at. Or alternately, it is first determined whether the probability value identified as the largest exceeds the prescribed minimum probability threshold. If the threshold is exceeded, only then is the object associated with the projected Gaussian blob from which the largest probability value was derived designated as being the object that the pointing device is pointing at.

Users of the XWand are often impressed with the immediate and natural feel of absolute pointing. However, the pure geometry-based approach which enables absolute pointing also has a number of important drawbacks. First, two or more cameras must be permanently mounted in the room. Besides the difficulty of installation, such cameras inevitably draw objections related to privacy. In addition, the cameras must be carefully calibrated to the room geometry upon installation, and recalibrated if they are moved. Further, at least two cameras must have clear sight-lines to the wand at all times. Finally, the three dimensional position of each active device in the room must be known, and small errors in the orientation and position information translate to inaccuracy in pointing, possibly disrupting the interaction.

Given these objections, alternatives to absolute pointing would be advantageous with the goal of eliminating the three dimensional positioning system. One general approach is to place tags in the environment, but they have drawbacks as well. By design tags require installation on every active device. Active tags such as IR beacons, for example, require their own power, while passive tags such as RF ID tags tend to have limited range, and tags based on visual features rely on rather sophisticated onboard processing.

3.0 WorldCursor System

The foregoing XWand system issues are resolved by the present system, which will be referred to herein as the WorldCursor system. The WorldCursor system uses the XWand device (or similar pointing device) but does not rely on a geometric model of pointing that requires the three dimensional position of the XWand, nor on tags placed in the environment, nor on any external sensing in general. Instead, a laser beam projected in the space gives the user feedback as to where the system believes the user is pointing, much in the same way that the cursor icon in "windows, icons, menus and pointing" (WIMP) interfaces provides feedback to indicate where the user is pointing with the mouse. In fact, the WorldCursor is analogous to the mouse and cursor used in traditional GUIs in that the user may select and interact with a physical device by positioning the cursor on the device and clicking.

In the foregoing context, the XWand is employed as a physical pointing mechanism, and it is coupled with the WorldCursor which projects a cursor on the physical environment. The WorldCursor improves upon the XWand by removing the need for external positioning technology such as video cameras or any other external position sensing technology, and by enabling the user to point with a high degree of precision.

Figure 2:
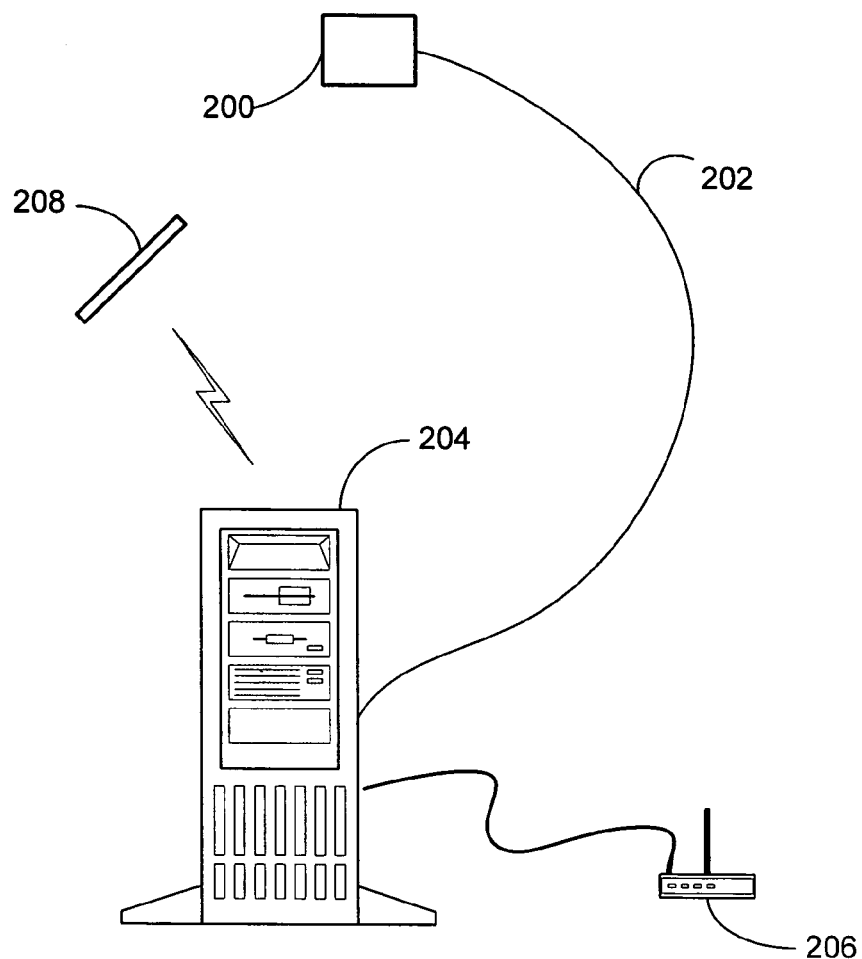
FIG. 2 is a diagram depicting a system for directing a laser beam within a space to act as a cursor according to the present invention.

Referring to FIG. 2, the WorldCursor system includes a small tele-operated motion platform 200 upon which is mounted a laser pointer. This device is controlled via a wired connection 202 to a host computer 204, which is also connected to the XWand RF base station 206. The World-Cursor platform 200 can be programmed to follow the motion of the XWand 208, such that when the user points the XWand to the left, for example, the WorldCursor moves a corresponding amount to the left in real time. The user attends to the projected laser spot (the cursor) in the environment. By moving the XWand the user is then able to place the cursor on any object in the room, as they would place the cursor on an onscreen object with the mouse. Because only the orientation information from the XWand is used, and not the XWand's 3-D position, the original XWand system's requirement of the external computer vision system is eliminated.

Interacting with active devices in the intelligent environment proceeds much as in the original XWand system. For example, to turn a household lamp on or off, instead of pointing directly at the lamp, the user moves the laser spot onto the lamp and clicks the XWand button. The system determines that the cursor is on the lamp by comparing the current cursor position with the recorded cursor position associated with the lamp, collected beforehand.

3.1 The WorldCursor Device

Figure 3:
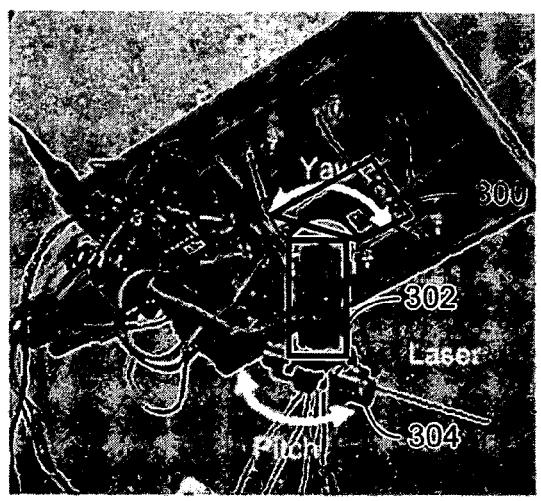
FIG. 3 is an image depicting one prototype version of the WorldCursor device employed in the system of FIG. 2.

In general, the WorldCursor device simply needs to take yaw and pitch commands in some form and in response move the laser spot to any desired place (within line of sight of the laser) in the space in which it is operating. Any device having this capability will suffice for use in the overall WorldCursor system. In tested embodiments of the World-Cursor system the aforementioned device took the form of a motion platform that is mounted on the ceiling, typically near the center of the room. A prototype of this device is shown in FIG. 3. It consisted of two high speed miniature servos, 300, 302 such as the type used on radio-controlled model airplanes. Specifically, in tested embodiments of the WorldCursor, Expert Electronic's SL451 High Speed Mini Servos (Model EXRSL451) were used. One of the servos 300 was mounted for yaw and a second of the servos 302 for pitch control. In one embodiment of the device, both servos 300, 302 were controlled by a PIC microcontroller, which takes yaw and pitch commands from the host computer via a RS-232 connection and converted them to standard servo motor commands. In an alternate embodiment, an API on the aforementioned host computer takes yaw and pitch values from the XWand, and converts then to standard servo motor commands. These commands are then sent to the servos 300, 302. It is noted that this latter scenario has the advantage of sending motor commands that are typically in integer form, rather than floating point data such as would be the case with pitch and yaw values.

Mounted on the servo assembly is a red laser 304 similar to those used in conventional laser pointers. By controlling the servos 300, 302, the platform is able to steer the laser spot to most points in the room below the ceiling, provided there exists a sight line to that point. In tested versions of the present system and process, effective resolution in steering the laser using the aforementioned servos is about 0.25 degrees or about one half inch at a distance of 9 feet. The servos were each capable of moving over nearly a 170 degree range at a speed of 333 degrees per second. Generally, this configuration resulted in the motion of the laser being smooth and responsive. However, in the case when the laser must move from pointing to a location in front of the platform to a location behind the platform, the pitch motor must move to the back and the yaw motor must reflect about the vertical plane separating the front and rear hemispheres. Because the servos employed in the tested embodiments had a 170 degree range limitation, there was a discontinuity in this movement of the laser spot from front to back (i.e., a 20 degree gap at the sides). While the aforementioned pointing inaccuracy and discontinuity were not found to be a problem in the tested embodiments, ideally, servos with a full 180 degree range and higher accuracy could be employed to resolve these minor deficiencies.

It is noted that the connection between the WorldCursor base unit and the host computer could also be of a wireless type. However, if this is the case care must be taken to ensure there is no interference with the XWand system.

3.2 World Model for the WorldCursor System

The WorldCursor points at a given object in the room by changing the pitch and yaw of the laser with its motors. It is therefore possible to uniquely associate a given object in the room with the yaw and pitch value used to point the WorldCursor at the object. The yaw and pitch values of each object of interest in the space are the basis for a convenient world model for the WorldCursor system based on spherical coordinates.

The spherical coordinate world model is easier to construct than the full three dimensional model of the original XWand system as described previously. For example, whereas in the three dimensional model the user had to either hold the XWand over the object, or provide several pointing examples used to triangulate the position of the object, the WorldCursor system need only record the current yaw and pitch values of the device once the user has put the cursor on the object. One limitation of this approach is that the spherical coordinate world model must be re-learned if the WorldCursor device is moved to a new location.

Figure 4A:
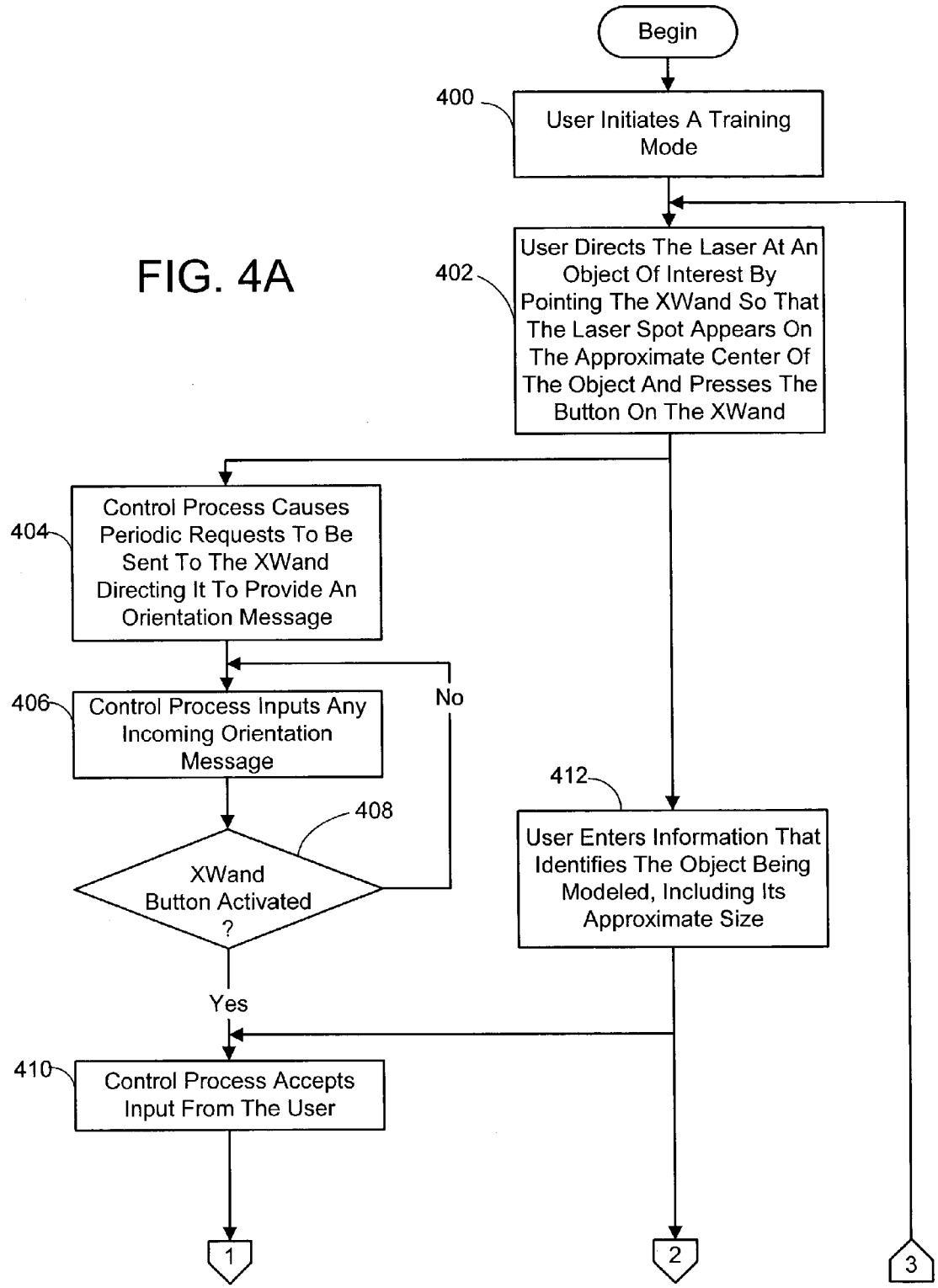
FIGS. 4A and B are a flow chart diagramming a process for modeling objects in a space using the WorldCursor system of FIG. 2, wherein the objects are modeled as circles using spherical coordinates.
Figure 4B:
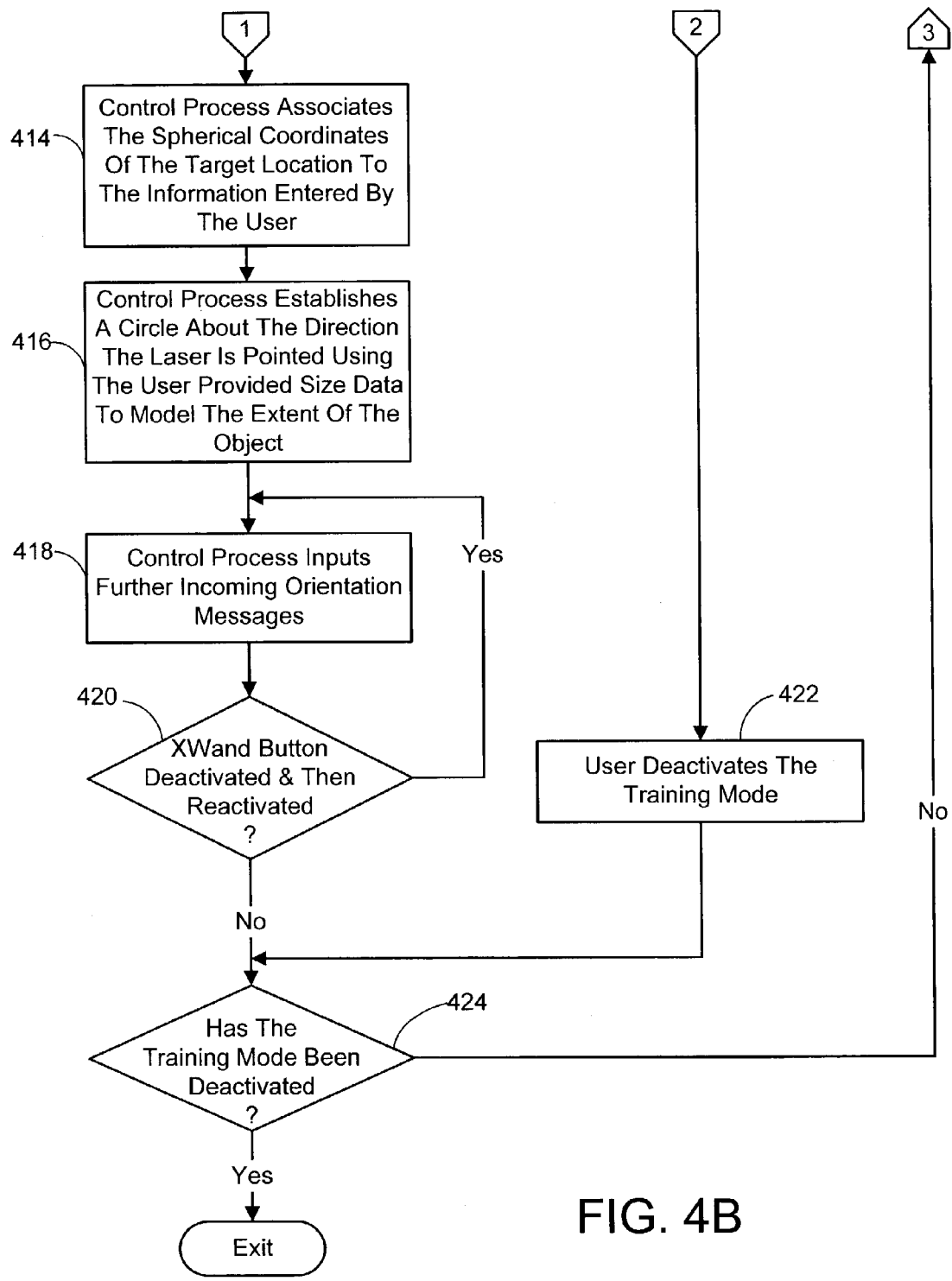

Given this, a model of the space that the WorldCursor system is to operate in can be established as follows. Referring to FIGS. 4A and B, the user initiates a training mode that is part of a WorldCursor control process running on the host computer (process action 400). The training mode has the same purpose as a similar process used in the XWand system—namely to learn where objects of interest are in the space. More particularly, the user directs the laser at an object of interest by pointing the XWand so that the laser spot appears on the approximate center of the object being modeled and presses the button on the XWand (process action 402). The control process causes periodic requests to be sent to the XWand directing it to provide an orientation message in the manner described previously (process action 404). Any incoming orientation message transmitted by the pointer is input (process action 406), and it is determined whether the button state indicator included in the message indicates that the pointer's button is activated (process action 408). If not, process actions 406 and 408 are repeated. When it is discovered that the button state indicator indicates the button is activated, then in process action 412, the control process accepts input from the user who enters information into the host computer that identifies the object being modeled, including its approximate size (process action 410). Since it was the control process running on the host computer that received the pitch and yaw data from the XWand and moved the laser of the WorldCursor to the target location as described previously, the pitch and yaw associated with the target spot are known. The process associates the spherical coordinates of the target location to the information entered by the user about the corresponding object (process action 414). In addition, the user-provided size data is used to establish a circle in spherical coordinates about the direction the laser is pointed that models the extent of the object (process action 416). Any incoming orientation message transmitted by the pointer continues to be input (process action 418) and a determination is made as to whether the button state indicator included in the messages first indicates that the pointer's button becomes deactivated and then activated again, thereby indicating that the user has pushed the XWand button again (process action 420). If it is, process actions 418 and 420 are repeated. If it is not, in process action 424, it is determined if the user has deactivated the training mode (process action 422), thus indicating all the objects it is desired to model in the space have been modeled. If the user has not deactivated the training mode, then process actions 402 through 424 are repeated to "learn" the next object the user chooses to identify to the system. Otherwise the process ends.

Once the objects in the space have been modeled as described above, user can direct the laser of the WorldCursor to the modeled objects and act upon them as was done in the XWand system. More particularly, the user shines the WorldCursor's laser beam on the object he or she wants to select. It is then determined whether the laser beam is on an object in the space that is known. Whenever the laser beam is on a known object, that object is selected for future control actions.

To determine if the laser beam is on an object, the user is required to activate the XWand switch when the laser beam is shining on the object he or she wants to select. The distance is computed in spherical coordinates between the current WorldCursor position and a position stored for each of the modeled objects. For coordinates $(\theta_c, \phi_c)$ of the WorldCursor and coordinates $(\theta_i, \phi_i)$ of the center of a given object, the user is deemed to be pointing at a modeled object if:

$$\sqrt{(\theta_i-\theta_c)^2+(\phi_i-\phi_c)^2} < r_i \qquad (1)$$

where radius $r_i$ indicates the size of the object modeled as a circle in spherical coordinates. It is noted that this method of determining if the user is pointing at a modeled object in the environment is clearly much easier than the previously-described Gaussian blob technique used in connection with the standalone XWand system.

In some cases the object being modeled in the environment will be better represented as a polygon rather than a circle. In addition, in some cases the WorldCursor may be needed to indicate one or more points on an object with a high degree of precision. Both of these issues are resolved by modeling the object in question as a polygon. This is accomplished by inputting a set of vertices that form a polygonal model of an object. To input the vertices, the user places the laser spot of the WorldCursor on each vertex of the polygon representing the object, in turn, while the WorldCursor system is in a training mode. Once the object is "trained", the system can then determine if the cursor is on the polygon by using standard point-in-polygon algorithms used in two dimensional graphics [1].

Figure 5A:
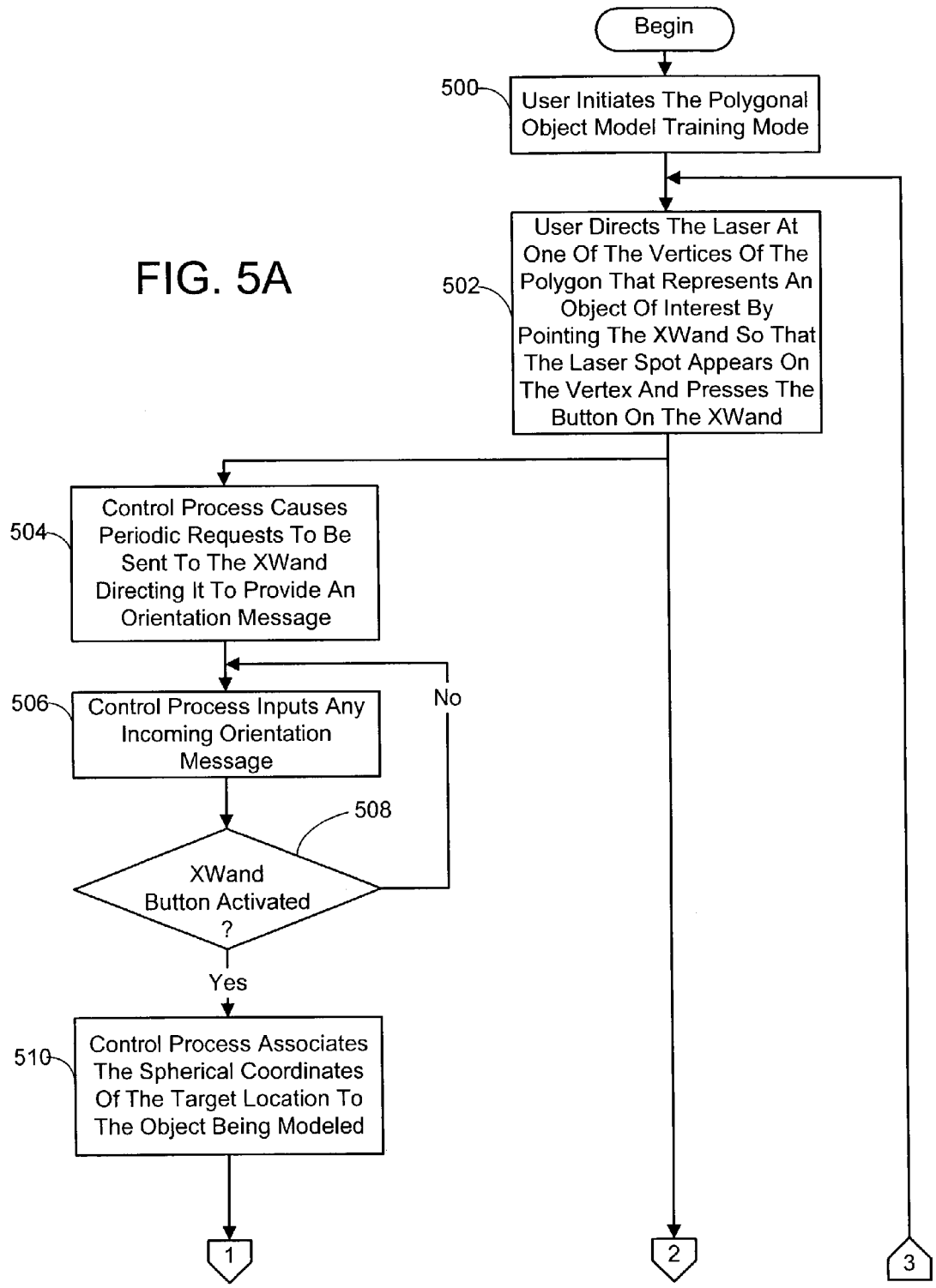
FIGS. 5A and B are a flow chart diagramming a process for modeling objects in a space using the WorldCursor system of FIG. 2, wherein the objects are modeled as polygons using spherical coordinates.
Figure 5B:
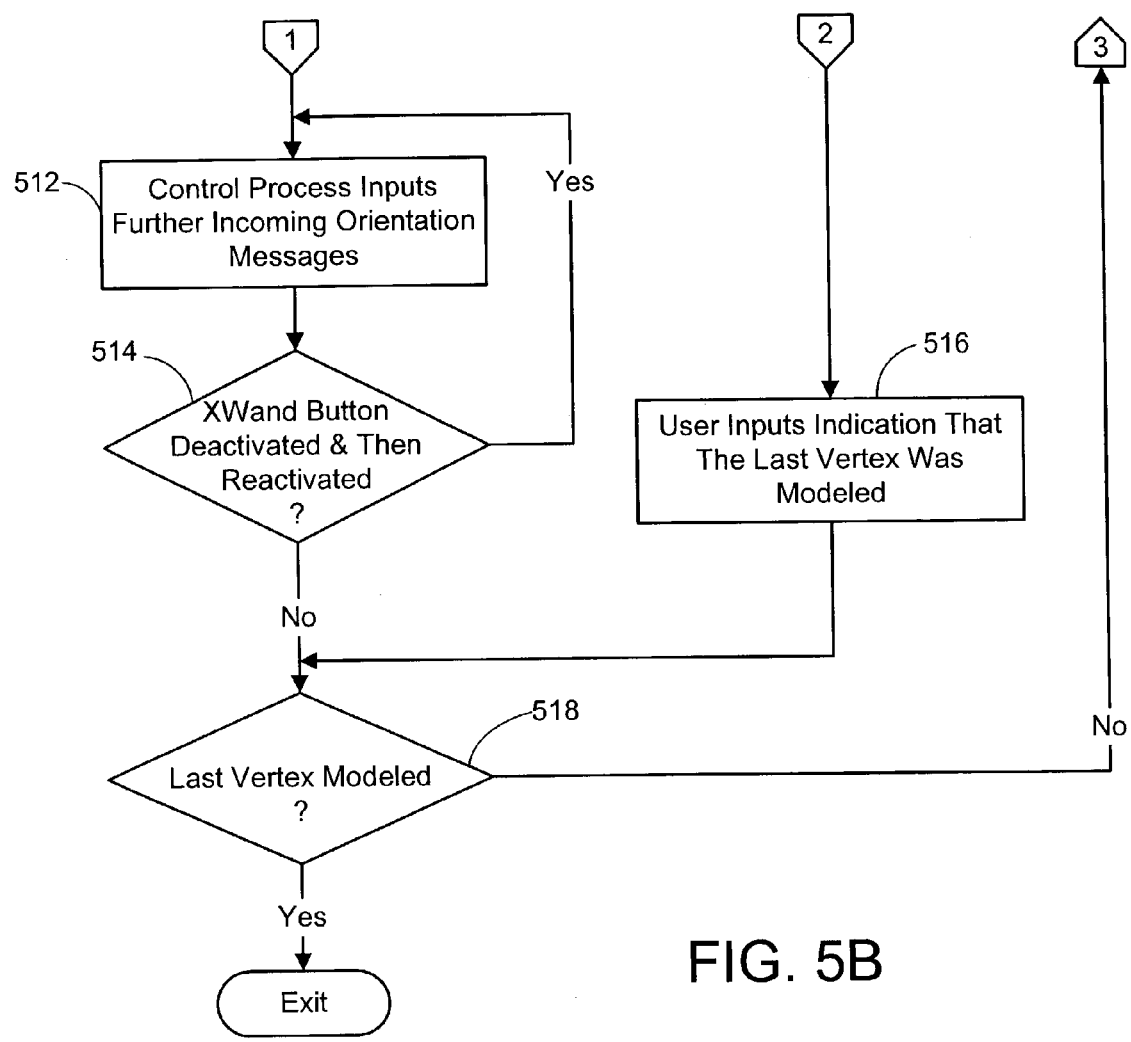

More particularly, a model of a polygonal object in the space that the WorldCursor system is operating in can be established as follows. Referring to FIGS. 5A and B, the user initiates the aforementioned training mode that is part of an control process running on the host computer, except also indicating a polygonal object is being modeled (process action 500). The user directs the laser by pointing the XWand so that the laser spot appears one of the vertices of the object being modeled and presses the button on the XWand (process action 502). The procedure then proceeds as before with the control process causing periodic requests to be sent to the XWand directing it to provide an orientation message in the manner described previously (process action 504). Any incoming orientation message transmitted by the pointer is input (process action 506), and it is determined whether the button state indicator included in the message indicates that the pointer's button is activated (process action 508). If not, process actions 506 and 508 are repeated. When it is discovered that the button state indicator indicates the button is activated, the process associates the spherical coordinates of the target location to the object vertex being modeled (process action 510). Any incoming orientation message transmitted by the pointer continues to be input (process action 512) and a determination is made as to whether the button state indicator included in the messages first indicates that the pointer's button becomes deactivated and then activated again, thereby indicating that the user has pushed the XWand button again (process action 514). If it is, process actions 512 and 514 are repeated. If it is not, in process action 518, it is determined if the last vertex has been identified by the user (process action 516). If so the process ends. If not, process actions 502 through 518 are repeated to "learn" the next vertex of the polygon. Optionally, either before or after the user points out all the vertices of the polygon being established to the model the object of interest, he or she can enter information into the host computer that identifies the object. This information would be associated with the object as well.

Once an object has been modeled as a polygon, it might also be desirable to know precisely where the cursor (i.e., laser spot) is on the object's surface in a local coordinate system, as mentioned above. For example, this polygon technique can be used to determine if the WorldCursor spot is on the active surface of a computer display, and if so where on that surface. In this way the WorldCursor can act as a display cursor as well.

For a four vertex polygonal surface such as a computer display, the desired location would be the cursor's screen coordinates. A transform from WorldCursor to screen coordinates allows the display to be seamlessly incorporated into the rest of the world model, as described later. In this case, a projective transform [3] can be used to transform WorldCursor coordinates to screen coordinates (x, y) as follows:

$$\begin{bmatrix} wx \\ wy \\ w \end{bmatrix} = \begin{bmatrix} p_{11} & p_{12} & p_{13} \\ p_{21} & p_{22} & p_{23} \\ p_{31} & p_{32} & 1 \end{bmatrix} \begin{bmatrix} \theta_c \\ \phi_c \\ 1 \end{bmatrix} \qquad (2)$$

The parameters $p_{ij}$ are determined by solving a linear system of equations given the four corners of the display in both WorldCursor and screen coordinates. Here the assumption is made that the WorldCursor coordinate system is linear in the region of the display, even though modeled in spherical coordinates—a valid assumption for typical sized displays.

More particularly, the projective transform of Eq. (2) takes coordinates (x,y) into coordinates (x',y') by way of a 3×3 matrix with 8 free parameters. Points $(x_i, y_i)$ are the coordinates of the 4 corners of the polygon in WorldCursor device coordinates, and the points $(x'_i, y'_i)$ are the coordinates of the same 4 corners in local coordinates (e.g., screen coordinates of a computer display). These values are collected in an offline training procedure in which the cursor is placed on each of the 4 corners of the polygon in turn, as described previously.

The matrix may be expressed as $$x' = \frac{p_{11}x + p_{12}y + p_{13}}{p_{31}x + p_{32}y + 1}, \quad y' = \frac{p_{21}x + p_{22}y + p_{23}}{p_{31}x + p_{32}y + 1}. \qquad (3)$$

Rearranging terms gives:

$$x' = p_{11}x + p_{12}y + p_{13} - p_{31}xx' - p_{32}yx' \qquad (4)$$

$$y' = p_{21}x + p_{22}y + p_{23} - p_{31}xy' - p_{32}yy'$$

From this linear system it is possible to solve for parameters $p_{ij}$ given 4 points $(x_i, y_i)$ which map to corresponding points $(x'_i, y'_i)$:

$$\begin{bmatrix} x'_1 \\ y'_1 \\ x'_2 \\ y'_2 \\ x'_3 \\ y'_3 \\ x'_4 \\ y'_4 \end{bmatrix} = \begin{bmatrix} x_1 & y_1 & 1 & 0 & 0 & 0 & -x'_1 x_1 & -x'_1 y_1 \\ 0 & 0 & 0 & x_1 & y_1 & 1 & -y'_1 x_1 & -y'_1 y_1 \\ x_2 & y_2 & 1 & 0 & 0 & 0 & -x'_2 x_2 & -x'_2 y_2 \\ 0 & 0 & 0 & x_2 & y_2 & 1 & -y'_2 x_2 & -y'_2 y_2 \\ x_3 & y_3 & 1 & 0 & 0 & 0 & -x'_3 x_3 & -x'_3 y_3 \\ 0 & 0 & 0 & x_3 & y_3 & 1 & -y'_3 x_3 & -y'_3 y_3 \\ x_4 & y_4 & 1 & 0 & 0 & 0 & -x'_4 x_4 & -x'_4 y_4 \\ 0 & 0 & 0 & x_4 & y_4 & 1 & -y'_4 x_4 & -y'_4 y_4 \end{bmatrix} \begin{bmatrix} p_{11} \\ p_{12} \\ p_{13} \\ p_{21} \\ p_{22} \\ p_{23} \\ p_{31} \\ p_{32} \end{bmatrix} \qquad (5)$$

During runtime, screen coordinates are computed from WorldCursor device coordinates using equation (2) above. Note that this computation is only performed after it is determined that the cursor is contained within the polygon described by the points $(x_i, y_i)$. Alternatively, one may always perform this mapping, and then check if the resulting screen coordinate values are contained within the polygon described by the points $(x'_i, y'_i)$ (a trivial calculation).

3.3 Controlling the WorldCursor System

In this section, various techniques for controlling the WorldCursor with the XWand are presented. The general scheme of the control mapping is that the WorldCursor should mimic the exact motion of the XWand, much in the same way that the cursor on a WIMP interface mimics the motion of the mouse. If $(\theta_c, \phi_c)$ is the yaw and pitch of the WorldCursor and $(\theta_w, \phi_w)$ is the yaw and pitch of the XWand, then $(\theta_c, \phi_c) \approx (\theta_w, \phi_w)$, at least for an absolute pointing mode as will be described shortly.

3.3.1 Filtering

Before passing on the output of the XWand to the WorldCursor controller, the yaw and pitch values from the XWand are first filtered to reduce the effects of noise in the sensors and to ease placing the cursor precisely on a small target. Two filters are used which average the last n samples (i.e., a box filter). The first is a very slow filter. For example, in tested versions of the WorldCursor, this slow filter averaged approximately the last 2.5 seconds worth of sensor data. This filter tends to dampen most XWand motion and allows the user to move the cursor relatively slowly for precise positioning. The second filter is much faster. For example, in tested versions of the WorldCursor, this fast filter averaged approximately the last 0.3 seconds worth of sensor data. This fast filter is appropriate for fast XWand movement, when the sensor noise is not as apparent, and responsiveness is desired.

Figure 6:
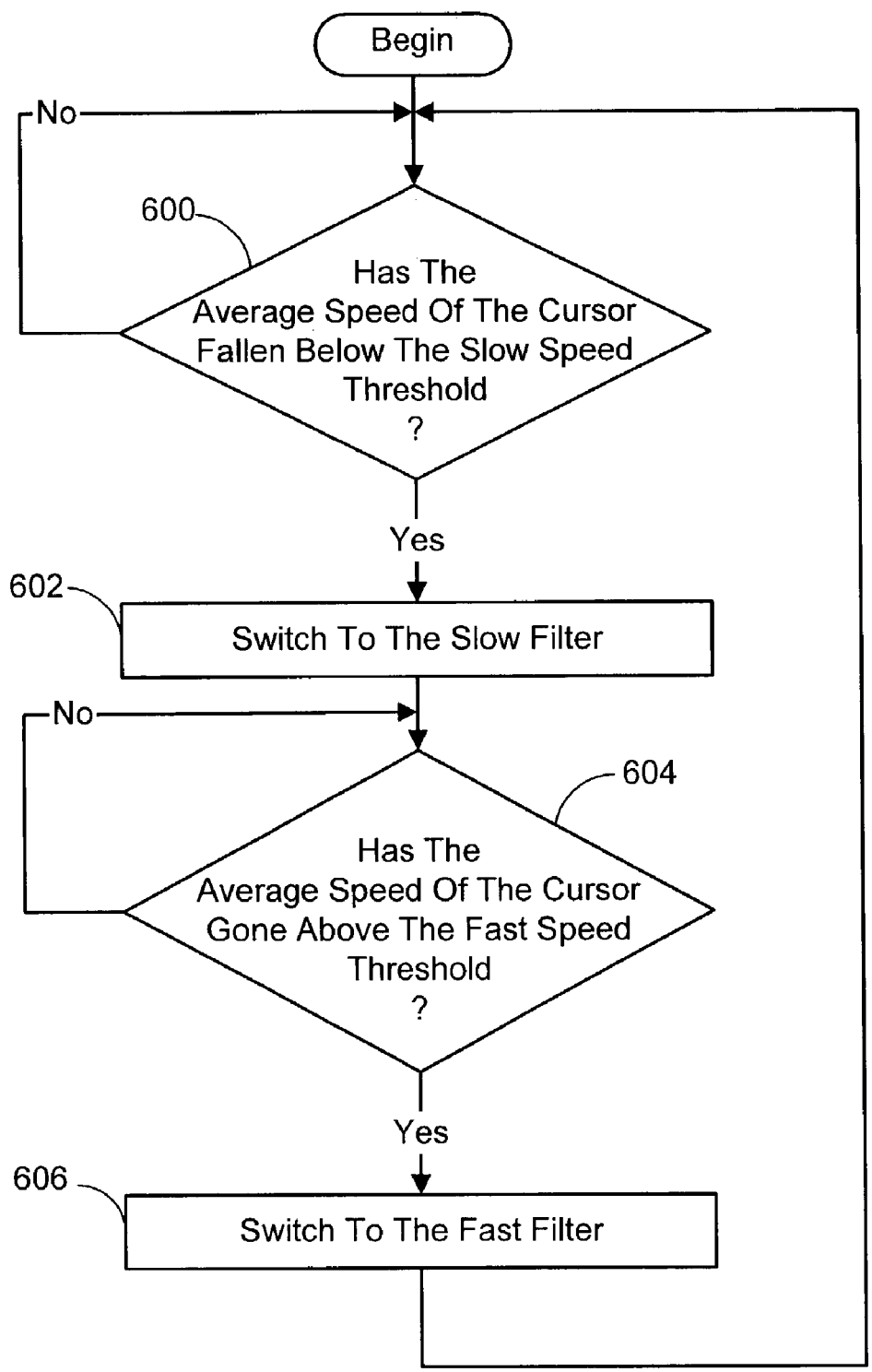
FIG. 6 is a flow chart diagramming a process for automatically switching between slow and fast filters to adjust the relative cursor movement-to-pointing device movement speed.

While the user could switch between the filter modes manually via input to the host computer, the WorldCursor control process running on that computer preferably switches between the slow and fast filters automatically. This is accomplished as follows. Referring to FIG. 6, and presuming that the fast filter is the initial default selection, it is first determined if the average speed of the cursor movement has fallen below a prescribed slow speed threshold $\tau_{slow}$ (process action 600). If not, then the speed of the cursor continues to be monitored by periodically repeating process action 600. It is noted that the speed of the cursor is determined by taking the estimated position returned by the fast filter, and computing the difference between that estimate and the same estimate computed in the previous time step, to get speed. In addition, the speed can be checked at any appropriate interval that ensures the cursor behaves in the aforementioned controlled manner. In tested embodiments of the control process, the speed was checked every time step (e,g., about 50 Hz). If it is determined in process action 600 that the cursor speed has fallen below the prescribed slow speed threshold, then in process action 602 the WorldCursor control process switches to the aforementioned slow filter. The cursor speed is then monitored again. More particularly, it is determined if the average speed of the cursor movement goes above a prescribed fast speed threshold $\tau_{fast}$ (process action 604). If not, then the speed of the cursor continues to be monitored by periodically repeating process action 604 in the manner employed previously. In general, the fast speed threshold $\tau_{fast}$ is much higher than the slow speed threshold. This prevents frequent shifts and ensures a smooth transition between filter modes at the appropriate times. While other values can be employed as desired, in tested embodiments of the control process $\tau_{slow}$ was set to 0.05 radians/second and $\tau_{fast}$ was set to 0.5 radians/second. If it is determined in process action 604 that the cursor speed has risen above the prescribed fast speed threshold, then in process action 606 the WorldCursor control process switches to the aforementioned fast filter. At this point, the filter selection procedure continues by repeating actions 600 through 606, for as long as the WorldCursor system is activated. In this way, a balance of speed, responsiveness and a fine degree of control are maintained.

3.3.2 Absolute vs. Relative Pointing

In the absolute pointing mode, the WorldCursor's laser ideally points at the same place as the XWand. The most basic control mapping to compute WorldCursor yaw and pitch ($\theta_c$, $\phi_c$) from the XWand yaw and pitch ($\theta_w$, $\phi_w$) to produce this absolute pointing is, $$\theta_c = \theta_{c0} + \theta_w - \theta_{w0} \quad (6)$$

$$\phi_c = \phi_{c0} + \phi_w - \phi_{w0} \quad (7)$$

where ($\theta_{c0}$, $\phi_{c0}$) and ($\theta_{w0}$, $\phi_{w0}$) are offset angles for the WorldCursor and XWand, respectively. These offsets are set to align the origins of the XWand and WorldCursor in a one time calibration procedure.

However, unless the WorldCursor platform and the XWand are very close to one another, it will be impossible to choose offsets ($\theta_{c0}$, $\phi_{c0}$) and ($\theta_{w0}$, $\phi_{w0}$) such that the XWand points directly at the WorldCursor laser spot throughout the range of pointing in the room. It will be possible to achieve approximate correspondence for a limited range of angles such as one wall of a room, but as soon as the WorldCursor is brought onto the opposite facing wall, for example, the correspondence will be far off.

It is not clear if users require even approximate correspondence for successful use of the device. Users' experience with mice suggests that absolute correspondence is not necessary. Much in the same way that users easily adapt to the relative movement of mouse and cursor, users of the WorldCursor may be able to adapt to the lack of absolute pointing, subject to the limitation that the laser spot is in their field of view. Thus, a relative pointing mode where the WorldCursor's laser spot moves with the movement of the XWand, but does not point at the same place in the environment, may be an acceptable operating condition. However, a number of procedures can be employed by which the WorldCursor and XWand can be brought into alignment to at least partially restore absolute pointing, and obtain other useful information about the environment as well. These alignment procedures will now be described in the section below.

3.3.2.1 Clutching

One procedure that the user can employ to re-establish the XWand-WorldCursor correspondence involves a "clutching" technique. This is an operation analogous to picking up a computer mouse, moving it in air, and putting the mouse down on the desk again, without the cursor moving. To clutch, the user clicks the XWand button while the WorldCursor control process is in operational mode (as opposed to training mode). At that point the laser dot stops moving with the XWand. The user may then reorient the XWand, lining it up so that it points directly at the laser spot. When ready to resume WorldCursor operation, the user clicks the button again and the laser spot resumes moving. At this moment new offset values ($\theta_{c0}$, $\phi_{c0}$) and ($\theta_{w0}$, $\phi_{w0}$) are also collected.

Figure 7A:
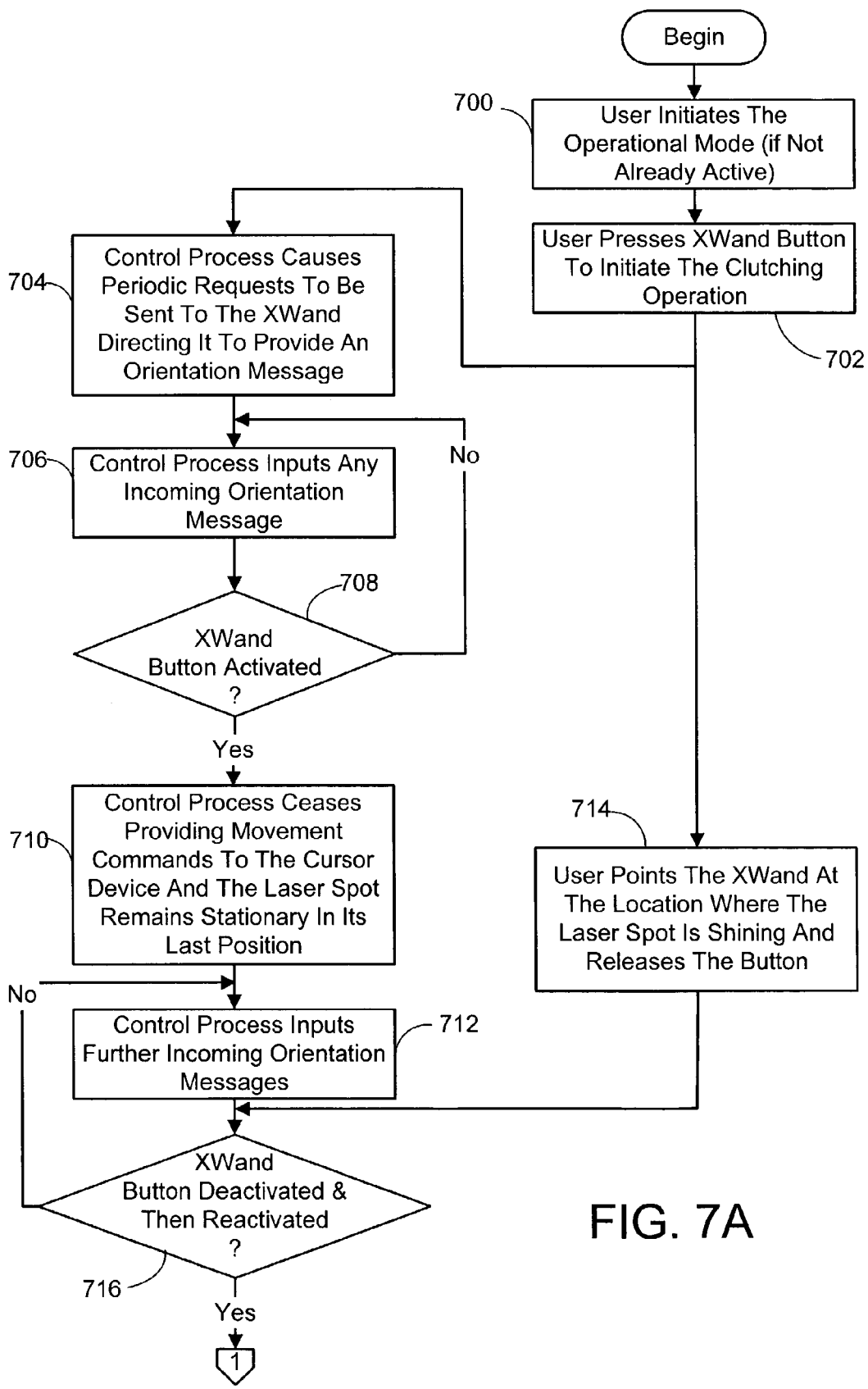
FIGS. 7A and B are a flow chart diagramming a clutching process for aligning the WorldCursor laser beam and XWand by making the laser beam shine on approximately the same location in the space that the XWand is pointed.
Figure 7B:
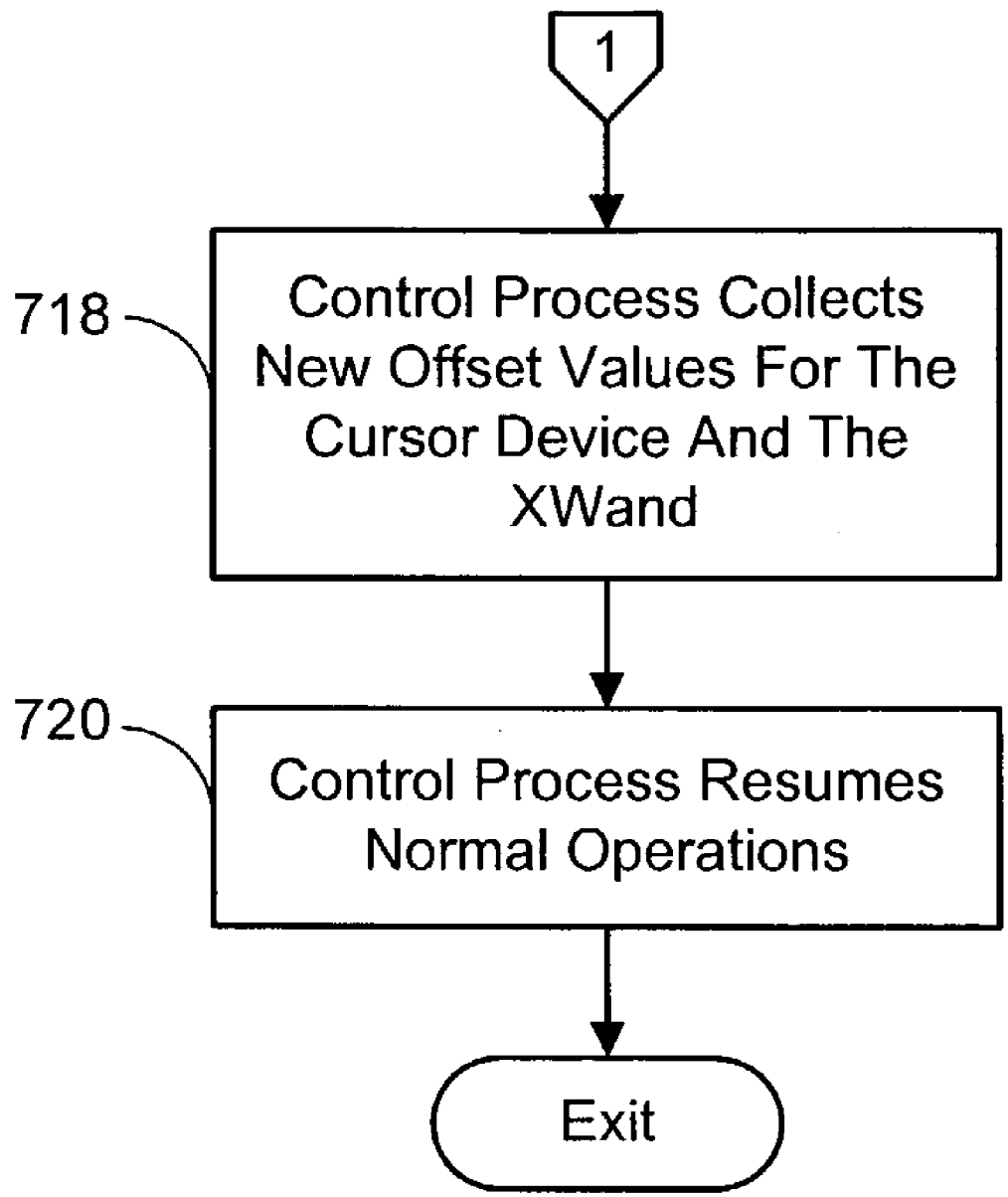

More particularly, referring to FIGS. 7A and B, the user initiates the operational mode of the WorldCursor control process, if it is not already active (process action 700). In the operational mode, the control process normally accepts XWand pitch and yaw inputs, computes the corresponding pitch and yaw for the WorldCursor laser, and sends commands to the WorldCursor unit to move the laser to match the computed pitch and yaw values, all in the manner described previously. This normal operation continues until the user presses the XWand button to initiate the clutching operation (process action 702). Specifically, the control process causes periodic requests to be sent to the XWand directing it to provide an orientation message (process action 704), and any incoming orientation message is input (process action 706). These orientation messages include the aforementioned XWand pitch and yaw values that are used to move the laser. They also include the XWand button state indicator. Thus, when a message is received it determined whether the button indicator indicates that the pointer's button is activated (process action 708). If not, normal operations are continued and process actions 706 and 708 are repeated. However, if it is discovered that the button state indicator indicates the button has been activated, then in process action 710, the control process ceases providing movement commands to the WorldCursor device and the laser spot remains stationary in its last position. The user then points the XWand at the location where the laser spot is shining (process action 714) and releases the button. Any incoming orientation message transmitted by the XWand continues to be input (process action 712) and a determination is made as to whether the button state indicator included in the messages first indicates that the pointer's button becomes deactivated and then activated again, thereby indicating that the user has pushed the XWand button again (process action 716). If it has not, process actions 712 and 716 are repeated. However, if it has, new offset values for the WorldCursor device and the XWand are collected (process action 718) and normal operations are resumed (process action 720).

Note that the user may use the foregoing clutching technique not to align the XWand with the WorldCursor, but to establish a particular desired range of operation for the XWand. For example, by clutching the user may set offsets so that the XWand may be held comfortably at the side of the body while the WorldCursor appears on a surface in front of the user. The procedure is the same except that the user does not point the XWand at the laser spot, but instead orients it as desired. This option put the WorldCursor system into a relative pointing mode as explained above.

3.3.2.2 Exploiting Room Geometry To Automatically Re-establish Correspondence

Another procedure that the user can employ to establish and maintain a reasonable correspondence between the XWand and WorldCursor without clutching involves exploiting the geometry of a room in which the WorldCursor system is operating. If the geometry of the room is known in terms of a 3D coordinate system, including the position of each wall, the WorldCursor device, and the XWand itself, then the WorldCursor may be controlled such that the XWand always points directly at the laser spot.

More particularly, if the 3D coordinates of the vertices of the walls in the room are known, and the 3D position and orientation of the XWand are also known, it is possible to compute the precise point on the wall that the XWand is pointing toward using standard polygonal analysis techniques. Then, using simple trigonometry (i.e., right triangle analysis in both the yaw and pitch planes), this 3-D 'wall point' can then be related back to the known 3D position of the WorldCursor device to compute an updated value of the yaw and pitch ($\theta_c$, $\phi_c$) that is used to point the laser at the aforementioned point on the wall.

By relying on the three dimensional position of the XWand, it may seem like the very same problem that it is desired to remove in developing the WorldCursor is being re-introduced—namely the XWand's reliance on external 3-D positioning technology. In practice, however, it is sufficient to know the room geometry only approximately and still achieve a useable alignment that requires no clutching. For example, it will typically suffice to fix the assumed XWand position in the middle of a typical office space, even though this may not coincide with its actual position. Of course, such an assumption may not provide an accurate alignment of the XWand and WorldCursor. However, in situations where relative pointing is acceptable this assumption can be made. Further other assumed XWand locations could be used instead to make the alignment more accurate. This is particularly useful when it is believed that the XWand will be at or near a particular position most of the time (e.g., the room occupant's desk). Again, this relies on the fact that users tend to be tolerant to constant offsets in alignment similar to that found in using relative pointing mechanisms such as computer mice.

3.3.2.3 Inferring 3D XWand Position to Re-establish Correspondence

A more accurate variation of the foregoing room geometry exploitation technique that can produce near absolute pointing results involves combining the geometry exploitation technique with the clutching procedure to determine the 3D location of the XWand in the room. If the user is clutching as described previously so that the XWand points at the laser spot, each clutching operation provides information that can be related mathematically to the 3D position of the XWand. After as few as two clutching operations, it is possible to compute the 3D position of the XWand.

More particularly, for each clutching operation performed with the WorldCursor laser spot shining on one of the walls whose vertices coordinates are known, there is an associated wall point $p_i$, as well as a vector $w_i$ that defines a ray pointing from the XWand to the wall point. These values are collected at the end of the clutching operation, after the user has realigned the XWand with the laser spot of the WorldCursor and pressed the XWand button to resume WorldCursor control. Essentially, the wall point $p_i$ can be computed via standard polygonal analysis techniques since the 3D coordinates of the vertices of the walls in the room are known, as are the 3D position of the WorldCursor base and orientation of its laser (i.e., the direction the laser is pointing from the base). The vector $w_i$ is defined by the orientation of the XWand that is determined as described previously. Assuming the XWand position x is held constant over a number of successive clutching operations, then $$x + s_i w_i = p_i \qquad (8)$$

where $s_i$ is a scalar. It is noted that the "wall points" can actually be any point on any surface in the space that is modeled as a polygon via the procedure described previously.

XWand position x can be found by solving the linear system of equations generated via successive clutching operations using a standard least squares approach. A minimum of two clutching operations are required, but for robustness it is be desirable to collect several, particularly if some of the rays $w_i$ are similar, in which case the solution will be sensitive to small errors in $w_i$.

Once the estimate of the XWand position has been updated, the control procedure described in Section 3.3.2.2 is used to maintain XWand-WorldCursor correspondence. So long as the actual position of the XWand does not change dramatically, no more clutching operations will be necessary to maintain the correspondence. It is noted that this online calibration requires no more clutching operations than the system which does not exploit the approximate room geometry, and in the long run requires fewer clutching operations if the user does not move about the room often. The user would only be aware of the procedure in that after a while no more clutching operations would be required to keep the cursor and the wand in alignment.

Figure 8:
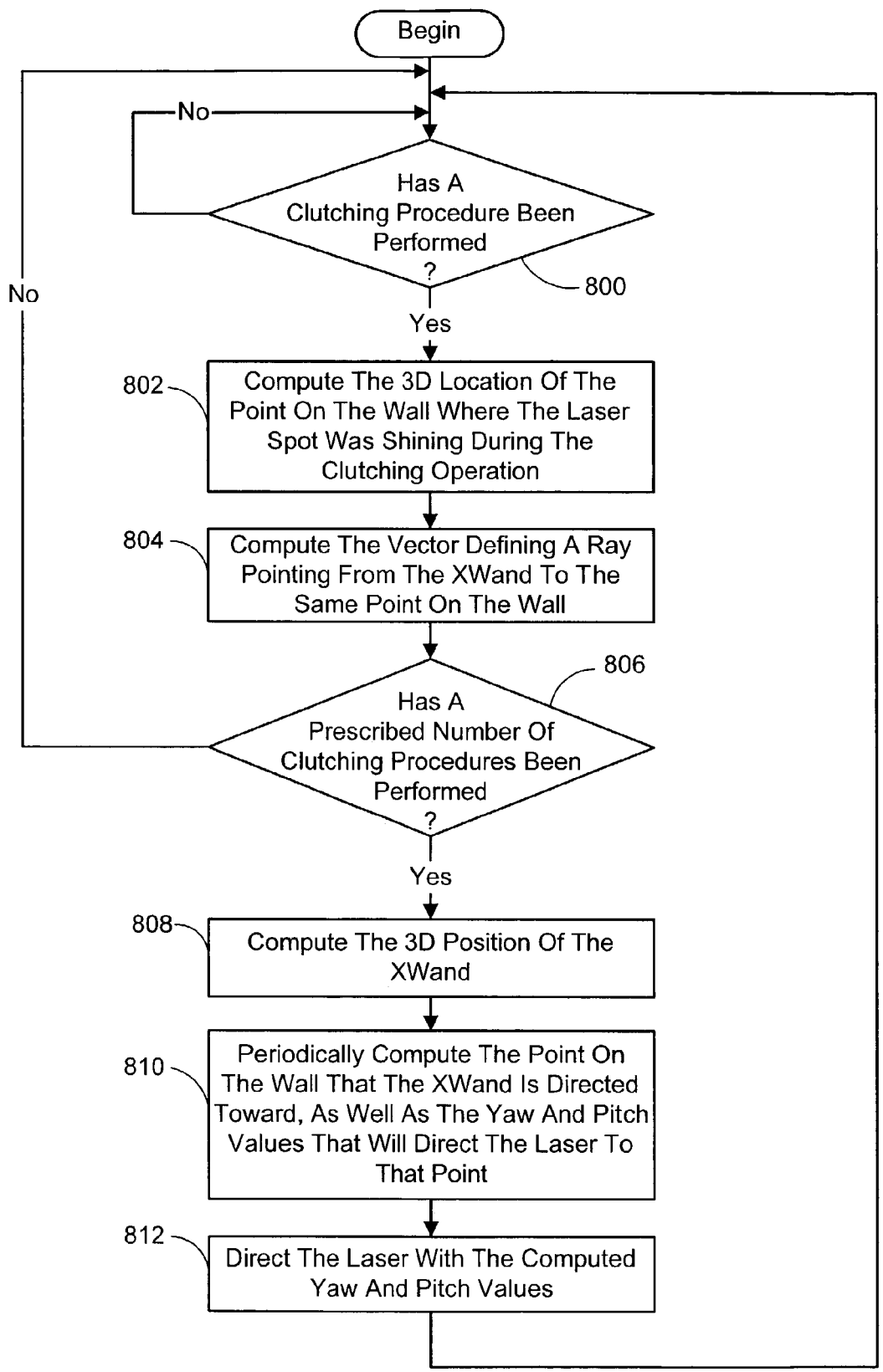
FIG. 8 is a flow chart diagramming one version of a process for establishing and maintain a reasonable alignment between the pointing device and WorldCursor involving computing the 3D location of the pointing device and using this along with a knowledge of the rest of the geometry of the space to compute the pitch and yaw angles that when applied to the WorldCursor laser will make it point at approximately the same location as the pointing device.

Accordingly, referring to FIG. 8, the XWand-WorldCursor correspondence can be maintained by first determining if a clutching procedure been performed (process action 800). If a clutching operation was not performed, action 800 is periodically repeated. However, if a clutching operation was performed, the 3D location of the point on the wall where the WorldCursor laser spot was shining during the clutching operation is computed (process action 802). In addition, the vector defining a ray pointing from the XWand to the same point on the wall is computed (process action 804). It is next determined if a prescribed number of clutching procedures have been performed (process action 806). If not, process actions 800 through 806 are repeated. If the prescribed number is met, then the 3D position of the XWand is computed (process action 808). Next, the point on the wall that the XWand is directed toward as it pointed around the space is periodically computed, as is the yaw and pitch values that will direct the WorldCursor laser at that point (process action 810). The WorldCursor laser is directed with these yaw and pitch values whenever they are computed (process action 812). Finally, the entire process (i.e., process actions 800 through 812) is repeated for a long as the WorldCursor is in operation.

It is noted that the number of clutching operations that must be performed before the XWand-WorldCursor correspondence is updated can alternately be determined based on how different each of the aforementioned rays $w_i$ are to each other, rather than using an absolute number. For example, in one method, if the latest ray to be computed does not differ from the previous rays computed since the last correspondence update by a prescribed threshold difference, then it is not counted in terms of how many clutching operations are required. In this way, any errors in the computation of the rays will not have a significant impact on the overall correspondence computations.

It should be noted that some assumptions are made in regard to the foregoing procedures for establishing and maintaining the XWand-WorldCursor correspondence. For example, it is assumed that the user is clutching to re-establish XWand and WorldCursor correspondence, and not to create a relative pointing relationship between them. In addition, it is assumed that the user in not moving about the room, but instead remains in the same location. It is noted, however, that most users are likely to use the XWand from one a small set of static locations, much as the TV remote control is likely to be used from either the couch or the easy chair. Accordingly, this assumption is quite valid.

3.4 Establishing a 3D Model of the Space Using the WorldCursor

In the foregoing procedures, it was assumed a polygonal model of the space was available. However, if this is not the case, it is possible to construct one given that the positions of the XWand and WorldCursor devices are known. More particularly, given the 3D location of XWand and its orientation (i.e., the direction it is pointing) in combination with the 3D location of the WorldCursor (which in this coordinate system could be designated as the origin if desired) and its orientation (which is assumed to be directed at the same point as the XWand via the aforementioned clutching operation), then, it is possible to solve for unknown wall points $p_i$ using simple trigonometry. Specifically, a triangle is formed by the 3D position of the XWand, the 3D position of the Worldcursor device, and the unknown wall point $p_i$. Since the 3D position of the XWand and the 3D position of the Worldcursor device are known, the distance between them can be computed. In addition, since the orientation of the XWand and the laser beam are known, it follows that two of the angles of the aforementioned triangle are also known. Thus, the wall point $p_i$ can be uniquely determined using standard trigonometric methods. In this way the 3D position of objects and devices in the room may be learned, much as in the original XWand system. For example, the user while holding the XWand in substantially the same location within the space would point it at an object (e.g., at its center) or to the vertices of a polygon representing an object of interest in the space (including the walls) to establish their 3D location and then enter information about the object, similar to the previously described procedure for establishing a model of the space in terms of spherical coordinates.

Thus, with a sufficient number of clutching operations to maintain the XWand-WorldCursor correspondence intact, it would be possible to learn the entire room geometry, including a polygonal model of the walls (which could then be used to thereafter run the foregoing procedures for maintaining the XWand-WorldCursor correspondence more automatically). However, it should be noted that even in this scenario, no more clutching operations would be necessary than in the case of not using a geometric model.

The foregoing procedure for learning geometry from clutching operations raises some interesting possibilities for inferring geometry over the normal use of the device, without relying on a special training mode or a lengthy upfront training session. This has interesting implications for ubiquitous computing applications, many of which rely on geometric models to develop location based services, and to reason about user co-presence and proximity to devices. One significant barrier to deploying such systems will be the construction of the necessary geometric models, especially in the home. The foregoing feature of the WorldCursor system can provide a solution for this problem.

4.0 Applications

4.1 Home Automation

The WorldCursor system is capable of performing all the home automation-related tasks of the original XWand system, including turning on and off lights via X10 (i.e., a powerline-based home automation system), selecting and manipulating the media player with gestures to control track and volume, and finally selecting and controlling a cursor on a display.

The WorldCursor improves on the XWand system by giving the user much more precision in selecting devices. In the original XWand system, for example, it would be difficult without audio feedback to select one of two devices that are located 18 inches apart from 12 feet away. This is due not only to the limited precision of the XWand system, but also in users' limited precision in pointing. This uncertainty can be addressed by placing a laser pointer (always on) on the XWand itself, but only up to the precision of the XWand signal processing algorithms.

The WorldCursor precision can be exploited in one application where to control the media player, the user puts the WorldCursor on one of several paper icons (play, pause, next track, previous track) hung on the wall. The user "presses" the media player button by pushing the XWand button. Menus and other traditional GUI metaphors may also be used.

4.2 Display Surfaces

In the original XWand system, the user may control a cursor on a console by first pointing the XWand at the console, and entering a cursor control mode by clicking the XWand button. Exiting the cursor control mode is accomplished by clicking on a special button presented in the interface during cursor control mode.

With the precision afforded by the WorldCursor, it is possible to improve upon this interaction by seamlessly integrating the display surface in the world model, without needing to enter a special cursor control mode. For example, once the four corners of the display are specified with the WorldCursor, the calculations described in Section 3.2 may be used to determine if the cursor is on the display. If the cursor is on the display, the laser is turned off, and the prospective projection equations are used to move the cursor to the exact spot on the display where the laser would be if it had not been turned off. Once the user moves the cursor off the display, the cursor is hidden and the laser is turned back on. Because of the nature of the WorldCursor geometric model, the registration between the two coordinate systems can be quite precise.

Further, with networked WorldCursor client processes it will be possible to extend this functionality across multiple displays simultaneously, moving from display to display seamlessly.

The drawback of the WorldCursor display integration is that the control of a small display from across the room can be quite difficult, since the size of the 'mousing surface' is related to the angle subtended by the display. In the XWand system, this problem is avoided in the special cursor control mode by using a constant scaled range of angles for control that is independent of where the user is located in the room. One approach to address this limitation is to nonlinearly warp the coordinate system in the neighborhood of the display.

4.3 Learning Geometric Models

Besides using the WorldCursor to 'point out' devices to the system, it may also be used by the system to 'point out' devices to the user. For example, if the intelligent environment knew where the user's lost keys were, the WorldCursor system might direct the user's attention to their location in response to the user's query.

4.4 Non-Veridical Behavior

Thus far WorldCursor control and applications which strive to replicate the exact motions of the user's manipulations of the XWand have been explored. There may also be interesting possibilities in considering how this one to one mapping may be violated.

For example, in [2] users' ability to finely control a standard laser pointer in an object selection task is studied. In part, performing object selection and other GUI related tasks with a laser pointer is difficult because it is surprisingly difficult to hold a laser pointer still. In Section 3.3.1, a switching filter technique was described which can be used to significantly dampen the motion of the cursor when the user is moving the XWand slowly. The WorldCursor can thus do for laser pointer-based interaction what 'SteadyCam' has done for home videos, by eliminating the jitter and noise associated with standard laser pointers. This damping filter is especially useful in working with display surfaces, where often GUI elements are small and densely packed. Thus, the WorldCursor system can act as an improved laser pointer.

In an environment where there are many selectable objects, it may be advantageous to employ a "Snap To" feature for the WorldCursor. If the user guides the cursor near an active device, a simple spring model may be used to bring the cursor precisely on the target. For example, a simple distance threshold can be employed such that if the laser beam is moved to a location near an object that is within the threshold distance, it is automatically redirected to the shine on that object. Not only may this ease target selection, it also is a convenient way to alert the user to the fact that the object is active and selectable.

In the case when the XWand is used with gestures to control the currently selected device, the WorldCursor can be used to 'play back' the gesture as a way to teach the user the available gestures for that device.

As with the mouse, users of the WorldCursor attend the cursor and almost never look at the XWand itself. In some cases users have difficulty finding the laser spot, particularly in the case when the cursor is 'parked' at a location in the environment out of the field of view, as in the beginning of a clutching operation. One solution to this problem is to bring the cursor to a 'home' position after a period of inactivity, or to animate the laser spot to draw the user's attention when the XWand is first picked up.

While throughout the foregoing description of the World-Cursor system the XWand was employed as a pointing device, this need not be the case. Generally, any conventional pointing device could be used to steer the WorldCursor laser. For example, a computer mouse, track ball, or gamepad could be adapted to this purpose. Of course, some of the above-described features of the XWand-WorldCursor combination would not be possible, such as the absolute pointing mode and 3D modeling features, because of the lack of pointer orientation data. However, the conventional pointing devices can support features such as spherical coordinate modeling and object selection, the above-described display surface feature, and general laser pointer-type functions.

5.0. REFERENCES

[1] Haines, E. (1994) In *Graphics Gems IV* (Ed, Heckbert, P.) Academic Press, pp. 24–46.
[2] Myers, B. A., R. Bhatnagar, J. Nichols, C. H. Peck, D. Kong, R. Miller, and A. C. Long (2002), Interacting At a Distance: Measuring the Performance of Laser Pointers and Other Devices, *in Proceedings CHI* Minneapolis, Minn.
[3] Zisserman, H. R. a. A. (2000) *Multiple View Geometry in Computer Vision*, Cambridge University Press.

Wherefore, what is claimed is:

1. A computer-implemented process for selecting an object within a space by a user causing a laser beam to be shone on the object, comprising using a computer to perform the following process actions:

directing a laser beam generated by a cursor device to shine on said object, wherein the cursor device comprises a laser which when activated projects said laser beam into the space and a pair of servos connected to laser, wherein the first of the servos is configured so as to move the laser in a manner that controls the yaw direction of the laser beam and the other of the servos is configured so as to move the laser in a manner that controls the pitch direction of the laser beam;

determining whether the laser beam is being shone on the object, said determination comprising, modeling the location of objects within the space as the particular pitch and yaw angles associated with the laser that cause the laser beam to shine on approximately the center of the object being modeled, modeling the extent of said objects as being a circle which is centered on the location representing said approximate center of the object being modeled; and whenever the laser beam is being shone on the object, selecting that object for future control actions.

2. The process of claim 1, wherein the process action of directing the laser beam to shine on said object, comprises the actions of:

inputting orientation data from a pointing device which periodically outputs said data, wherein the orientation data is indicative of the direction the pointing device is pointed;

computing the direction the pointing device is pointing from the received orientation data; and directing the laser beam to shine on said object based on the direction the pointing device is pointing.

3. The process of claim 2, wherein the pointing device comprises a manually-operated switch which is activated and deactivated by the user for the purpose of instructing the computing device to implement a function, and wherein the state of the switch in regard to whether it is activated or deactivated at the time orientation data is output is included in that data, and wherein the process action of modeling the location of objects within the space, comprises, for each object, the actions of:

initiating a training mode in response to a user-specified command to do so;

inputting the periodically output orientation data from the pointing device;

determining if the pointing device's switch has been activated by the user each time the orientation data is input, wherein said user activates said switch whenever the cursor device's laser beam is shining on approximately the center of the an object being modeled; and whenever the pointing device's switch has been activated, recording the direction the cursor device's laser is pointing in terms of its pitch and yaw angle, inputting user-entered information that identifies the object being modeled, and associating the recorded laser direction with the identified object.

4. The process of claim 3, wherein the process action of modeling the extent of objects, comprises, for each object, the actions of:

inputting user-entered information that specifies the size of an object being modeled;

computing an extent for said object in terms of the spherical coordinates of a circle centered about said recorded direction the cursor device's laser; and associating the computed extent with the identified object.

5. The process of claim 4, wherein the process action of determining whether the laser beam is being shone on an object, further comprises the actions of:

initiating an object selection mode in response to a user-specified command to do so;

determining if the pointing device's switch has been activated by the user each time the orientation data is input, wherein said user activates said switch whenever the cursor device's laser beam is shining on an object in the space the user wants to select; and whenever the pointing device's switch has been activated, computing the distance between the current pitch and yaw angles of the laser and the pitch and yaw angle associated with each object modeled for the space, and for each of the modeled objects, determining if the computed distance is less than a radius of said circle used to model the extent of the object, and designating that the laser beam is being shone on an object whenever the computed distance is found to be less than a radius of the circle used to model the extent of the object.

6. A computer-implemented process for selecting an object within a space by a user causing a laser beam to be shone on the object, comprising using a computer to perform the following process actions:

directing a laser beam generated by a cursor device to shine on said object, wherein the cursor device comprises a laser which when activated projects said laser beam into the space and a pair of servos connected to laser, wherein the first of the servos is configured so as to move the laser in a manner that controls the yaw direction of the laser beam and the other of the servos is configured so as to move the laser in a manner that controls the pitch direction of the laser beam;

determining whether the laser beam is being shone on the object, said determination comprising modeling objects within the space as polygons, wherein the user shines the laser beam on points associated with an object being modeled to identify them as vertices of the polygon; and whenever the laser beam is being shone on the object, selecting that object for future control actions.

7. The process of claim 6, wherein the process action of shining the laser beam on a vertex point, comprises the actions of:

inputting orientation data from a pointing device which periodically outputs said data, wherein the orientation data is indicative of the direction the pointing device is pointed;

computing the direction the pointing device is pointing from the received orientation data; and directing the laser beam to shine on the vertex point based on the direction the pointing device is pointing.

8. The process of claim 7, wherein the pointing device comprises a manually-operated switch which is activated and deactivated by the user for the purpose of instructing the computing device to implement a function, and wherein the state of the switch in regard to whether it is activated or deactivated at the time orientation data is output is included in that data, and wherein the process action of modeling objects within the space as polygons, comprises, for each object, the actions of:

initiating a training mode in response to a user-specified command to do so;

inputting the periodically output orientation data from the pointing device;

determining if the pointing device's switch has been activated by the user each time the orientation data is input, wherein said user activates said switch whenever the cursor device's laser beam is shining on a vertex of the polygon that is being identified to represent the object; and whenever the pointing device's switch has been activated, recording the direction the cursor device's laser is pointing in terms of its pitch and yaw angle, associating the recorded laser direction with one of the vertices of the object being modeled, repeating the inputting, determining, recording and associating actions until all the vertices of the polygon representing the object are recorded.

9. The process of claim 8, wherein the process action of modeling objects further comprises an action of inputting user-entered information that identifies the object being modeled and associating it with the recorded polygon vertices representing the object.

10. The process of claim 8, wherein the process action of determining whether the laser beam is being shone on an object, further comprises the actions of:

initiating an object selection mode in response to a user-specified command to do so;

determining if the pointing device's switch has been activated by the user each time the orientation data is input, wherein said user activates said switch whenever the cursor device's laser beam is shining on an object in the space the user wants to select; and whenever the pointing device's switch has been activated, employing a point-in-polygon technique to determine if the laser beam is shining on one of the objects modeled with a polygon and if so which one.

11. The process of claim 8, further comprising an action of determining the point on a polygon representing an object that the laser beam is shining on using a transform that maps the pitch and yaw angle coordinates of the laser to orthogonal coordinates of the polygon.

12. The process of claim 11, wherein the polygon representing an object is a rectangle having four recorded vertices, and wherein the process action of determining the point on a polygon representing an object that the laser beam is shining on using a transform that maps the pitch and yaw angle coordinates of the laser to rectangular coordinates of the polygon, comprises employing a projective transform defined by $$\begin{bmatrix} wx \\ wy \\ w \end{bmatrix} = \begin{bmatrix} p_{11} & p_{12} & p_{13} \\ p_{21} & p_{22} & p_{23} \\ p_{31} & p_{32} & 1 \end{bmatrix} \begin{bmatrix} \theta_c \\ \phi_c \\ 1 \end{bmatrix}$$

where x and y are the rectangular coordinates of the polygon, $\theta_c$ and $\phi_c$ are the yaw and pitch angles of the laser, and $p_{ij}$ are projective parameters established by solving a linear system of equations given the pitch and yaw coordinates of the vertices of the rectangular polygon and the rectangular coordinates these vertices.

13. A computer-implemented process for selecting an object within a space by a user causing a laser beam to be shone on the object, comprising using a computer to perform the following process actions:

directing a laser beam generated by a cursor device comprising a laser which is capable of projecting a laser beam into the space to shine on said object or whenever a user directs the laser beam to point at a location within the space that is within a prescribed threshold distance from a modeled object, automatically redirecting the laser beam to shine on the object;

determining whether the laser beam is being shone on the object; and whenever the laser beam is being shone on the object, selecting that object for future control actions.

14. A system for directing a laser beam within a space to act as a cursor, comprising:

a pointing device which periodically outputs orientation data indicative of the direction it is pointing;

a cursor device which comprises a laser which when activated projects said laser beam into the space and a pair of servos connected to laser, wherein a first of the servos is configured so as to move the laser in a manner that controls the yaw direction of the laser beam and the other of the servos is configured so as to move the laser in a manner that controls the pitch direction of the laser beam;

a general purpose computing device which is in communication with the pointing device and the cursor device; and a computer program comprising program modules executable by the computing device, wherein the computing device is directed by the program modules of the computer program to, receive the orientation data output by the pointing device and compute the direction the pointing device is pointing from the received orientation data in terms of yaw and pitch angles, and direct the laser beam generated by a cursor device to a particular location in the space as determined by the direction the pointing device is pointing, such that the laser beam is directed in an absolute pointing mode wherein the location in the space where the laser beam is pointed is substantially the same location that the pointing device is pointed, said directing in the absolute pointing mode comprising, computing a set of offset angles for the laser of the cursor device comprising respective yaw and pitch angles that define the angular distance between the origin of the spherical coordinate system associated with the cursor device and a prescribed origin of the spherical coordinate system for the space, computing a set of offset angles for the pointing device comprising respective yaw and pitch angles that define the angular distance between the origin of the spherical coordinate system associated with the pointing device and a prescribed origin of the spherical coordinate system for the space, computing aligning pitch and yaw angles that define how far the cursor device must move the laser in order to point the laser beam at approximately the same point in the space that the pointing device is pointing at, wherein the aligning pitch angle is defined as the sum of the offset pitch angle of the laser and the computed pitch angle of the pointing device less its offset pitch angle, and wherein the aligning yaw angle is defined as the sum of the offset yaw angle of the laser and the computed yaw angle of the pointing device less its offset yaw angle, and directing the laser to move to the computed aligning pitch and yaw angles so as to point the laser beam at approximately the same location in the space that the pointing device is pointing to.

15. The system of claim 14, wherein said sets of offset angles comprise initial angle values which are valid for only a part of the space such that when the pointing device is pointed outside the part of the space where the initial offset values are valid the correspondence between the location the pointing device is pointing and the location the laser beam is shining on is lost, and wherein the sub-module for directing the laser beam in an absolute pointing mode comprises a sub-module for maintaining said correspondence between the pointing device and the laser beam.

16. The system of claim 15, wherein the pointing device comprises a manually-operated switch which is activated and deactivated by a user for the purpose of instructing the computing device to implement a function, and wherein the state of the switch in regard to whether it is activated or deactivated at the time orientation data is output is included in that data, wherein the sub-module for maintaining the correspondence between the pointing device and the laser beam, comprises sub-modules for:

determining if the pointing device's switch has been activated by the user each time the orientation data is received, wherein said user activates said switch whenever the correspondence between the pointing device and the laser beam is to be re-established;

whenever the pointing device's switch has been activated,
ceasing to provide new movement commands to the cursor device so as to stop the motion of the laser beam,
determining if the pointing device's switch has been first deactivated by the user and then reactivated using the received orientation data, wherein said user reactivates said switch whenever the pointing device has been pointed at the location on which the stationary laser beam is shining;

whenever the pointing device's switch has been reactivated,
recomputing said sets of offset angles,
reinitiating the sending of new movement commands to the cursor device.

17. The system of claim 15, wherein the sub-module for maintaining the correspondence between the pointing device and the laser beam, comprises sub-modules for:

inputting the orthogonal coordinates of the vertices of polygonal surfaces in the space, the orthogonal coordinates of the cursor device, and the orthogonal coordinates of the pointing device in terms of an orthogonal coordinate system of the space;

for a polygon in the space which the orthogonal coordinates of its vertices have been input and at which the pointing device is pointed, determining the location of point on the polygon that the pointing device is pointed at in terms of its orthogonal coordinates in the space;

computing pitch and yaw angles in terms of the spherical coordinate system of the cursor device associated with a line connecting the orthogonal coordinates of said polygon point and the orthogonal coordinates of the cursor device; and directing the laser to move to the computed pitch and yaw angles so as to point the laser beam at approximately the same location in the space that the pointing device is pointing to.

18. The system of claim 17, wherein the sub-module for inputting the orthogonal coordinates of the pointing device, comprises sub-modules for inputting approximated coordinates of the pointing device.

19. The system of claim 18, wherein the approximated coordinates of the pointing device correspond to a location in the space where the pointing device usually resides.

20. The system of claim 15, wherein the sub-module for maintaining the correspondence between the pointing device and the laser beam, comprises sub-modules for:

inputting the orthogonal coordinates of the vertices of polygonal surfaces in the space and the orthogonal coordinates of the cursor device in terms of a orthogonal coordinate system of the space;

computing the orthogonal coordinates of the pointing device;

for a polygon in the space which the orthogonal coordinates of its vertices have been input and at which the pointing device is pointed, determining the location of point on the polygon that the pointing device is pointed at in terms of its orthogonal coordinates in the space in view of the orthogonal coordinates of the pointing device and the previously computed direction it is pointing;

computing pitch and yaw angles in terms of the spherical coordinate system of the cursor device associated with a line connecting the orthogonal coordinates of said polygon point and the orthogonal coordinates of the cursor device; and directing the laser to move to the computed pitch and yaw angles so as to point the laser beam at approximately the same location in the space that the pointing device is pointing to.

21. The system of claim 20, wherein the pointing device comprises a manually-operated switch which is activated and deactivated by a user for the purpose of instructing the computing device to implement a function, and wherein the state of the switch in regard to whether it is activated or deactivated at the time orientation data is output is included in that data, wherein the sub-module for computing the orthogonal coordinates of the pointing device, comprises sub-modules for:

(a) determining if the user has performed a clutching operation;

(b) whenever a clutching operation has been performed,
for a polygon in the space which the orthogonal coordinates of its vertices have been input and at which the laser beam of the cursor device is shining on as a result of the clutching operation, determining the location of the point on the polygon where the laser beam is shining in terms of its orthogonal coordinates in the space and in view of the orthogonal coordinates of the pointing device and the previously computed direction it is pointing, recording the location of said point on the polygon where the laser beam is shining as well as the previously computed direction that the pointing device is pointing at the end of the clutching operation; and (c) determining if a defined number of clutching operation have been performed, whenever the defined number of clutching operations have not been performed, repeating actions (a) and (b), whenever the defined number of clutching operations have been performed, solving a linear system of equation for the orthogonal coordinates of the pointing device in the space using a least squares approach, wherein each equation in the system of equations is associated with one of the clutching operations and is defined as the sum of the unknown orthogonal coordinates of the pointing device and the recorded direction that the pointing device was pointing at the end of the clutching operation under consideration multiplied by a scaling factor, all of which is set equal to the orthogonal coordinates of the recorded location of said point on the polygon where the laser beam was shining at the end of the clutching operation under consideration; wherein (d) a clutching operation comprises the actions of, determining if the pointing device's switch has been activated by the user each time the orientation data is received, wherein said user activates said switch whenever the correspondence between the pointing device and the laser beam is to be re-established;

whenever the pointing device's switch has been activated, ceasing to provide new movement commands to the cursor device so as to stop the motion of the laser beam, determining if the pointing device's switch has been first deactivated by the user and then reactivated using the received orientation data, wherein said user reactivates said switch whenever the pointing device has been pointed at the location on which the stationary laser beam is shining;

whenever the pointing device's switch has been reactivated, recomputing said sets of offset angles, reinitiating the sending of new movement commands to the cursor device.

22. The system of claim 21, wherein the sub-module for determining if a defined number of clutching operation have been performed, comprises a sub-module for determining if a prescribed number of clutching operations have been performed.

23. The system of claim 21, wherein the sub-module for determining if a defined number of clutching operation have been performed, comprise a sub-module for determining if a prescribed number of valid clutching operations have been performed, wherein a clutching operation is valid if the recorded direction that the pointing device was pointing at the end of the clutching operation under consideration differs from the recorded direction that the pointing device was pointing at the end of each previous clutching operation by a prescribed threshold difference.

24. A system for directing a laser beam within a space to act as a cursor, comprising:

a pointing device which periodically outputs orientation data indicative of the direction it is pointing;

a cursor device which projects a laser beam in the space;

a general purpose computing device which is in communication with the pointing device and the cursor device; and a computer program comprising program modules executable by the computing device, wherein the computing device is directed by the program modules of the computer program to, receive the orientation data output by the pointing device and compute the direction the pointing device is pointing from the received orientation data in terms of yaw and pitch angles, and direct the laser beam generated by a cursor device to a particular location in the space as determined by the direction the pointing device is pointing, such that the laser beam is directed in a relative pointing mode wherein the location in the space where the laser beam is pointed is not the same location that the pointing device is pointed, and wherein the relationship between where the pointing device is pointing and where the laser beam is pointing is allowed to vary over time.

25. A system for directing a laser beam within a space to act as a cursor, comprising:

a pointing device which periodically outputs orientation data indicative of the direction it is pointing;

a cursor device which projects a laser beam in the space;

a general purpose computing device which is in communication with the pointing device and the cursor device; and a computer program comprising program modules executable by the computing device, wherein the computing device is directed by the program modules of the computer program to,
- receive the orientation data output by the pointing device and compute the direction the pointing device is pointing from the received orientation data in terms of yaw and pitch angles, and
- direct the laser beam generated by a cursor device to a particular location in the space as determined by the direction the pointing device is pointing, such that the laser beam is directed in a relative pointing mode wherein the location in the space where the laser beam is pointed is not the same location that the pointing device is pointed, and wherein a fixed relative pointing condition is created between the pointing device and the laser beam wherein the difference between the direction that the pointing device is pointing and the direction that the laser beam is pointing remains substantially constant over time.

26. The system of claim 25, wherein the cursor device comprises a laser which when activated projects said laser beam into the space and a pair of servos connected to laser, wherein a first of the servos is configured so as to move the laser in a manner that controls the yaw direction of the laser beam and the other of the servos is configured so as to move the laser in a manner that controls the pitch direction of the laser beam, and wherein the sub-module for creating a fixed relative pointing condition between the pointing device and the laser beam, comprises sub-modules for:
- computing a set of offset angles for the laser of the cursor device comprising respective yaw and pitch angles that define the angular distance between the origin of the spherical coordinate system associated with the cursor device and a prescribed origin of the spherical coordinate system for the space;
- computing a set of offset angles for the pointing device comprising respective yaw and pitch angles that define the angular distance between the origin of the spherical coordinate system associated with the pointing device and a prescribed origin of the spherical coordinate system for the space;
- computing pitch and yaw angles that define how far the cursor device must move the laser in order to point the laser beam at approximately the same point in the space that the pointing device is pointing to, wherein the aligning pitch angle is defined as the sum of the offset pitch angle of the laser and the computed pitch angle of the pointing device less its offset pitch angle, and wherein the aligning yaw angle is defined as the sum of the offset yaw angle of the laser and the computed yaw angle of the pointing device less its offset yaw angle;
- ascertaining the angular difference that is desired between the pointing device and the cursor device; and
- directing the laser to move to the computed aligning pitch and yaw angles plus the ascertained angular difference.

27. The system of claim 26, wherein the pointing device comprises a manually-operated switch which is activated and deactivated by a user for the purpose of instructing the computing device to implement a function, and wherein the state of the switch in regard to whether it is activated or deactivated at the time orientation data is output is included in that data, wherein the sub-module for ascertaining the angular difference that is desired between the pointing device and the cursor device, comprises performing a clutching procedure which comprises sub-modules for:
- determining if the pointing device's switch has been activated by the user each time the orientation data is received, wherein said user activates said switch whenever the angular difference that is desired between the pointing device and the cursor device is to be set;
- whenever the pointing device's switch has been activated, ceasing to provide new movement commands to the cursor device so as to stop the motion of the laser beam,
- determining if the pointing device's switch has been first deactivated by the user and then reactivated using the received orientation data, wherein said user reactivates said switch whenever the pointing device has been pointed in a direction that defines the angular difference that is desired between the pointing device and the cursor device;
- whenever the pointing device's switch has been reactivated, reinitiating the sending of new movement commands to the cursor device.

28. The system of claim 27, wherein said sets of offset angles comprise initial angle values which are valid for only a part of the space such that when the pointing device is pointed outside the part of the space where the initial offset values are valid the previously set angular difference between the location the pointing device is pointing and the location the laser beam is shining on is lost, and wherein the sub-module for creating a fixed relative pointing condition between the pointing device and the laser beam further comprises a sub-module for maintaining said angular difference between the pointing device and the laser beam by repeating said clutching procedure and re-computing the sets of offset angles prior to executing the sub-module for reinitiating the sending of new movement commands to the cursor device.

29. A system for establishing a 3D model of a space wherein objects within the space are modeled as a group of vertices defining polygons, comprising:
- a pointing device which periodically outputs orientation data indicative of the direction it is pointing and which comprises a manually-operated switch which is activated and deactivated by a user for the purpose of instructing the computing device to implement a function, and wherein the state of the switch in regard to whether it is activated or deactivated at the time orientation data is output is included in that data;
- a cursor device which projects a laser beam in the space;
- a general purpose computing device which is in communication with the pointing device and the cursor device; and
- a computer program comprising program modules executable by the computing device, wherein the computing device is directed by the program modules of the computer program, for each polygon being established in the model of the space, to,
  - initiate a training mode in response to a user-specified command to do so;
  - input the orthogonal coordinates of the cursor device and the pointing device in terms of an orthogonal coordinate system of the space,
  - receive the orientation data output by the pointing device and compute the direction the pointing device is pointing from the received orientation data in terms of yaw and pitch angles,
  - direct the laser beam generated by a cursor device to point at the same location in the space that the pointing device is pointed toward, determine if the pointing device's switch has been activated by the user each time the orientation data is received, wherein said user activates said switch whenever the cursor device's laser beam is shining on a point in the space that corresponds to a vertex of a polygon that is being used to model an object in the space; and whenever the pointing device's switch has been activated when the training mode is active, compute the orthogonal coordinates of the point in space that the pointing device and the laser beam are pointed at in view of the orthogonal coordinates of the pointing device and the direction it is pointing and the orthogonal coordinates of the cursor device and the direction it is pointing, and associate the computed orthogonal coordinates of the point in space with the corresponding vertex of the object being modeled, repeat the determining, computing and associating actions until all the vertices of the polygon representing the object being modeled are determined.

30. The system of claim 29, wherein the computer program further comprises a program module for inputting user-entered information that identifies an object being modeled and associating it with the polygon vertices representing the object.

* * * * *